US009343755B2

(12) United States Patent
Vanderwees et al.

(10) Patent No.: US 9,343,755 B2
(45) Date of Patent: May 17, 2016

(54) METHOD AND SYSTEM FOR COOLING CHARGE AIR FOR A FUEL CELL, AND THREE-FLUID CHARGE AIR COOLER

(71) Applicant: Dana Canada Corporation, Oakville (CA)

(72) Inventors: Doug Vanderwees, Mississauga (CA); Colin A. Shore, Hamilton (CA)

(73) Assignee: Dana Canada Corporation, Oakville, Ontario (CA)

( * ) Notice: Subject to any disclaimer, the term of this patent is extended or adjusted under 35 U.S.C. 154(b) by 289 days.

(21) Appl. No.: 13/777,626

(22) Filed: Feb. 26, 2013

(65) Prior Publication Data
US 2013/0224613 A1  Aug. 29, 2013

Related U.S. Application Data

(60) Provisional application No. 61/603,734, filed on Feb. 27, 2012.

(51) Int. Cl.
*H01M 8/04* (2016.01)
*F28D 9/00* (2006.01)
*H01M 8/02* (2016.01)

(52) U.S. Cl.
CPC ........ *H01M 8/04141* (2013.01); *H01M 8/0267* (2013.01); *H01M 8/04014* (2013.01); *Y02E 60/50* (2013.01)

(58) Field of Classification Search
CPC .......... H01M 8/04141; H01M 8/0267; H01M 8/04014
USPC .................................................. 429/414, 439
See application file for complete search history.

(56) References Cited

U.S. PATENT DOCUMENTS

| 4,081,025 | A | 3/1978 | Donaldson |
| 5,462,113 | A | 10/1995 | Wand |
| 5,755,280 | A | 5/1998 | da Costa et al. |
| RE35,890 | E | 9/1998 | So |
| 6,089,313 | A | 7/2000 | Levy et al. |
| 6,199,626 | B1 | 3/2001 | Wu et al. |
| 6,244,334 | B1 | 6/2001 | Wu et al. |
| 6,273,183 | B1 | 8/2001 | So et al. |
| 6,948,559 | B2 | 9/2005 | Reinke et al. |
| 7,276,308 | B2 | 10/2007 | Formanski et al. |

(Continued)

FOREIGN PATENT DOCUMENTS

DE  102004014669 A1  10/2005
FR  2977308 A1  1/2013

OTHER PUBLICATIONS

International Search Report with Written Opinion for PCT/CA2013/050143.

*Primary Examiner* — Sean P Cullen
(74) *Attorney, Agent, or Firm* — Marshall & Melhorn, LLC

(57) ABSTRACT

A method and system for cooling a pressurized charge air in the fuel cell system of a vehicle, using first and second charge air coolers. The system further includes a gas-to-gas humidifier and a fuel cell stack. According to the method and system, cathode exhaust gas passes through the gas-to-gas humidifier and is also used as the coolant gas in the first charge-air cooler. Therefore, the fuel cell cathode exhaust is heated and reduced in water content, reducing the tendency of water in the exhaust to condense and pool underneath the vehicle. Also provided is a three-fluid heat exchanger which integrates the first and second charge air coolers.

23 Claims, 20 Drawing Sheets

(56) References Cited

U.S. PATENT DOCUMENTS

| | | |
|---|---|---|
| 7,380,544 B2 | 6/2008 | Raduenz et al. |
| 7,703,282 B1 | 4/2010 | Meissner et al. |
| 7,703,505 B2 | 4/2010 | So et al. |
| 7,992,628 B2 | 8/2011 | Melby et al. |
| 2002/0026999 A1 | 3/2002 | Wu et al. |
| 2004/0151959 A1* | 8/2004 | Formanski et al. ............ 429/26 |
| 2004/0159424 A1* | 8/2004 | Reinke et al. ................ 165/140 |
| 2005/0019633 A1 | 1/2005 | Tanaka |
| 2005/0037250 A1* | 2/2005 | Gunther ............ H01M 8/04014 429/414 |
| 2005/0095488 A1 | 5/2005 | Formanski et al. |
| 2006/0251943 A1* | 11/2006 | Hatoh et al. .................... 429/32 |
| 2007/0125527 A1* | 6/2007 | Flik et al. ...................... 165/140 |
| 2008/0066895 A1 | 3/2008 | Wegner |
| 2008/0081238 A1 | 4/2008 | Becker et al. |
| 2008/0087410 A1 | 4/2008 | Muller-Lufft et al. |
| 2008/0102335 A1 | 5/2008 | Skala |
| 2008/0121381 A1 | 5/2008 | So et al. |
| 2009/0253021 A1* | 10/2009 | Baika .............................. 429/34 |
| 2009/0272515 A1 | 11/2009 | Wu et al. |
| 2010/0203365 A1 | 8/2010 | Konrad et al. |
| 2011/0207023 A1* | 8/2011 | Becker et al. ................. 429/512 |
| 2011/0213305 A1 | 9/2011 | Jonsson et al. |
| 2012/0181712 A1 | 7/2012 | Vanderwees et al. |

* cited by examiner

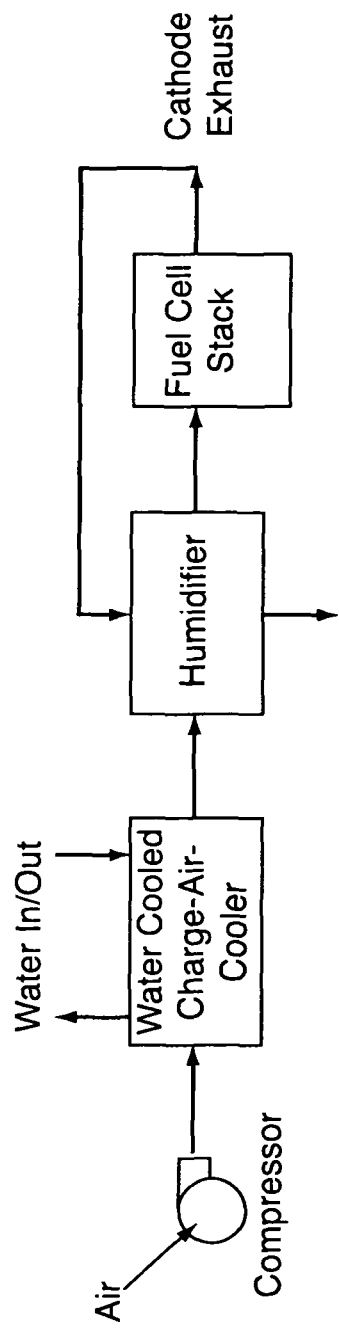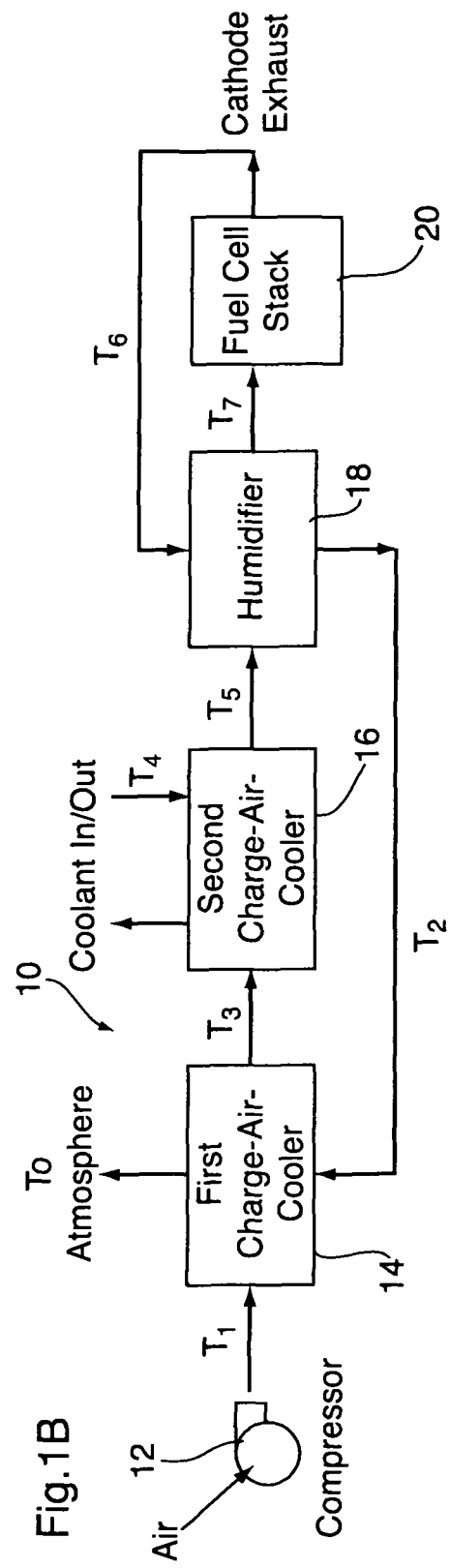

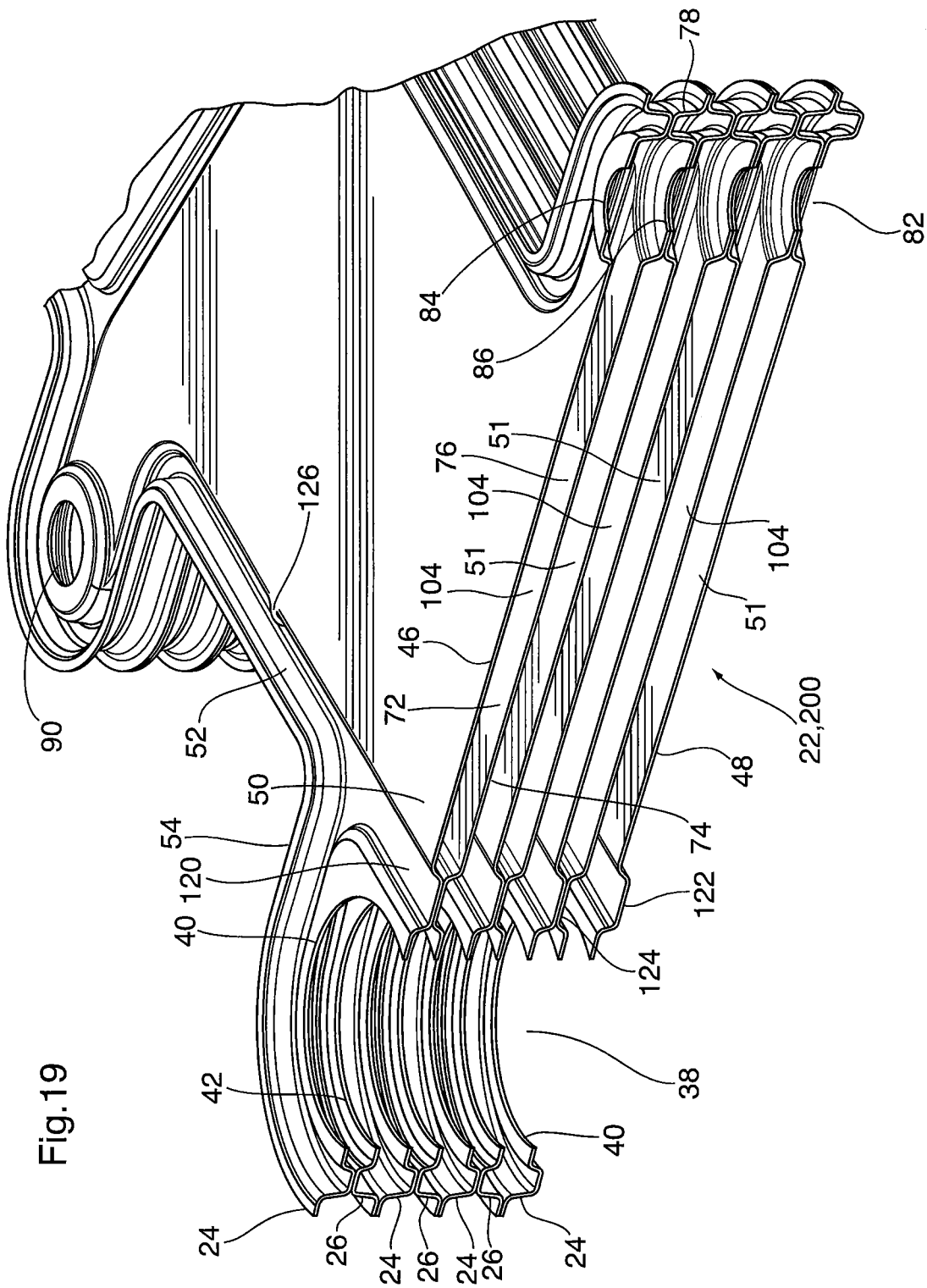

METHOD AND SYSTEM FOR COOLING CHARGE AIR FOR A FUEL CELL, AND THREE-FLUID CHARGE AIR COOLER

CROSS-REFERENCE TO RELATED APPLICATION

This application claims priority to and the benefit of U.S. Provisional Patent Application No. 61/603,734 filed Feb. 27, 2012, the contents of which are incorporated herein by reference.

FIELD OF THE INVENTION

The invention relates to methods and systems for cathode thermal management of fuel cell systems for vehicles, and to three-fluid charge air coolers which may be used in such methods and systems, but which are adapted for use in other systems where gas cooling is required.

BACKGROUND OF THE INVENTION

The cathode of a fuel cell utilizes pressurized charge air which is brought up to the fuel cell's operating pressure by an air compressor. During compression the air can become heated to a temperature of about 200° C. or higher, which is considerably higher than the operating temperature of the fuel cell. Therefore, a charge air cooler is used to cool the pressurized charge air to the desired temperature before it reaches the fuel cell stack; and before it reaches a humidifier that may be in-line between the air compressor and the fuel cell stack.

Conventional cathode thermal management systems use a liquid-to-air charge air cooler to remove heat from the charge air. The liquid coolant is typically water or a water-glycol mixture which is circulated through the fuel cell cooling system. The heat absorbed by the liquid coolant is subsequently rejected to the atmosphere through a heat exchanger, such as a radiator, in the front of the vehicle. The fuel cell engine itself also generates waste heat, which is low grade heat because of the relatively low stack operating temperature. This low grade heat rejection typically requires a relatively large radiator, and the added heat load from the charge air cooler that is rejected through this same radiator, forces a further increase in radiator size, to the point that the radiator may be difficult to package in the front space of the vehicle. Thus, the cooling of charge air places an additional load on the fuel cell's cooling system and complicates packaging in an already limited space. An example of such a prior art cathode thermal management system is illustrated in FIG. 1A.

Alternative approaches to cathode thermal management are needed in order to reduce the thermal load on the fuel cell cooling system, while ensuring that the charge air is cooled to an appropriate temperature. Furthermore, it is desired to reduce parasitic energy losses in the cooling of fuel cell engine.

SUMMARY OF THE INVENTION

In one aspect there is provided a method for cooling a pressurized cathode air stream in a fuel cell system comprising a fuel cell stack, a first charge air cooler comprising a gas-to-gas charge air cooler, a gas-to-gas humidifier, and a second charge air cooler. The method comprises: (a) providing said pressurized cathode air stream having a first temperature ($T_1$); (b) passing said pressurized cathode air stream through said first charge air cooler in heat exchange with a cathode exhaust gas stream from said fuel cell stack, wherein said cathode exhaust gas stream has a second temperature ($T_2$) at an inlet of said first charge air cooler and said pressurized cathode air stream is cooled to a third temperature ($T_3$) at an outlet of said first charge air cooler; (c) passing said pressurized cathode air stream through said second charge air cooler in heat exchange with a liquid or gaseous coolant having a fourth temperature ($T_4$) at a coolant inlet of said liquid-to-gas charge air cooler, wherein said pressurized cathode air stream is cooled to a fifth temperature ($T_5$) at an outlet of said second charge air cooler; (d) passing said pressurized cathode air stream and said cathode exhaust stream through said gas-to-gas humidifier, wherein water vapour is transferred from the cathode exhaust stream to the pressurized cathode air stream in said humidifier; and (e) passing said pressurized cathode air stream to a cathode air inlet of said fuel cell stack. The cathode exhaust stream passes through said gas-to-gas humidifier before passing through said first charge air cooler; and wherein said pressurized cathode air stream passes through said humidifier after it passes through said second charge air cooler and before it enters the cathode air inlet of said fuel cell stack.

In an embodiment, temperatures $T_2 < T_3 < T_1$ and/or $T_4 < T_5 < T_3$ under normal operating conditions.

In an embodiment, the cathode exhaust gas stream is at a sixth temperature ($T_6$) at an inlet of said gas-to-gas humidifier and wherein the pressurized cathode air stream is at a seventh temperature ($T_7$) at an outlet of the gas-to-gas humidifier, wherein $T_5 < T_7 < T_6$ under normal operating conditions. Also, in some embodiments, $T_2 < T_6$ under normal operating conditions.

In an embodiment, the second charge air cooler is a liquid-to-gas charge air cooler and wherein the liquid coolant absorbs heat from one or more other heat sources within the fuel cell system.

In an embodiment, the amount of thermal energy removed from the pressurized cathode air stream by the first charge air cooler is greater than the amount of thermal energy removed from the pressurized cathode air stream by the second charge air cooler.

In another aspect, there is provided a system for producing a pressurized cathode air stream for use in a fuel cell. The system comprises: (a) a first charge air cooler comprising a gas-to-gas charge air cooler for cooling said pressurized cathode air stream from a first temperature ($T_1$) to a third temperature ($T_3$) with a gaseous coolant having a second temperature ($T_2$) at an inlet of the first charge air cooler; (b) a second charge air cooler for cooling said pressurized cathode air stream from $T_3$ to a fifth temperature ($T_5$) with a liquid or gaseous coolant having a fourth temperature ($T_4$) at a coolant inlet of said second charge air cooler; (c) a gas-to-gas humidifier for increasing a water content of the pressurized cathode air stream by transfer of water from a humidifying gas; and (d) a fuel cell stack having a cathode air inlet and a cathode exhaust gas outlet. The humidifying gas comprises a cathode exhaust gas stream from the cathode exhaust gas outlet of the fuel cell stack. The gaseous coolant of the first charge air cooler comprises the cathode exhaust gas stream. The first charge air cooler is arranged to receive the cathode exhaust gas stream from the humidifier and the humidifier is arranged to receive the cathode exhaust gas stream from the cathode exhaust gas outlet of the fuel cell stack.

In an embodiment, the first charge air cooler and the second charge air cooler are arranged sequentially such that the second charge air cooler receives said pressurized cathode air stream at said third temperature ($T_3$) from said first charge air cooler.

In an embodiment, the second charge air cooler is a liquid-to-gas charge air cooler, and wherein the first charge air cooler and the second charge air cooler are integrated into a three-fluid charge air cooler comprising a plurality of flow passages for said pressurized cathode air stream, a plurality of flow passages for said gaseous coolant, and a plurality of flow passages for said liquid coolant.

In an embodiment, the cathode air inlet receives said pressurized cathode air stream from said gas-to-gas humidifier, which may be a membrane humidifier.

In an embodiment, the system further comprises a compressor which receives air at ambient temperature and pressure and compresses said ambient air to produce said pressurized cathode air stream at said first temperature ($T_1$), and wherein the first charge air cooler receives the pressurized cathode air stream from the compressor.

In an embodiment, the second charge air cooler is a gas-to-gas charge air cooler, wherein the second charge air cooler is cooled by a variable speed fan, and wherein the variable speed fan is controlled by a control circuit so as to maintain the temperature $T_7$ within a desired range.

In an embodiment, the second charge air cooler is a liquid-to-gas charge air cooler in which the pressurized cathode air stream is cooled by a liquid coolant which circulates through a cooling circuit which also includes the fuel cell stack, and wherein the cooling circuit includes a variable speed pump which controls the flow of the liquid coolant through the fuel cell stack and the second charge air cooler.

In yet another aspect there is provided a three-fluid charge air cooler. The charge air cooler comprises a plurality of plates arranged in a plate stack having a first end and a second end and a length extending from the first end to the second end, the plate stack being divided along its length into a first portion and a second portion, the charge air cooler having a plurality of charge air flow passages alternating throughout the stack with a plurality of first coolant flow passages and with a plurality of second coolant flow passages. The three-fluid charge air cooler further comprises: a charge air inlet manifold and a charge air outlet manifold in flow communication with the plurality of charge air flow passages, wherein the charge air inlet manifold and the charge air outlet manifold are located proximate to opposite ends of the plate stack; a first coolant inlet manifold and a first coolant outlet manifold in flow communication with the plurality of said first coolant flow passages, wherein the first coolant flow passages extend along the second portion of the plate stack, wherein, the first coolant inlet manifold is located at the second end of the plate stack, and the first coolant outlet manifold is located in the second portion of the plate stack, proximate to said ribs; a second coolant inlet manifold and a second coolant outlet manifold in flow communication with the plurality of said second coolant flow passages, wherein the second coolant flow passages extend along the first portion of the plate stack, and wherein the second coolant inlet manifold is located in the first portion of the plate stack, proximate to said ribs, and the second coolant outlet manifold is located at the first end of the plate stack.

In an embodiment, the inlet and outlet manifolds for the charge air, the first coolant and the second coolant are integrally formed with and enclosed by the plate stack, and the charge air flow passages may extend along the entire length of the plate stack. The three-fluid charge air cooler may further comprise a plurality of ribs dividing the first portion of the stack from the second portion, wherein each of the ribs is formed in one of the plates of the plate stack and extends transversely across said plate to separate one of the first coolant flow passages from one of the second coolant flow passages, such that the plurality of ribs separate the plurality of first coolant flow passages from the plurality of second coolant flow passages.

In an embodiment, the charge air inlet manifold is located at the first end of the plate stack and the charge air outlet manifold is located at the second end of the plate stack.

In an embodiment, the plate stack includes a plurality of first core plates and a plurality of second core plates, each of the first core plates and each of the second core plates having a flat plate bottom surrounded by an upstanding wall; wherein the flat plate bottom of each said first core plate is sealed to the flat plate bottom of an adjacent one of said second core plates, wherein pairs of first and second core plates sealed together along their plate bottoms are separated by flat separator plates. The flat plate bottom of at least one of the first and second core plates in each said pair of plates may be provided with at least one hole.

BRIEF DESCRIPTION OF THE DRAWINGS

Embodiments of the invention are now discussed below with reference to the drawings, in which:

FIG. 1A is a schematic diagram illustrating a conventional method and system for cathode thermal management of a fuel cell system.

FIG. 1B is a schematic diagram illustrating a method and system for cathode thermal management of a fuel cell system according to a first embodiment of the invention.

FIG. 19 is a transverse cross section along line 19-19' of FIG. 12.

DETAILED DESCRIPTION

Figure 1C:
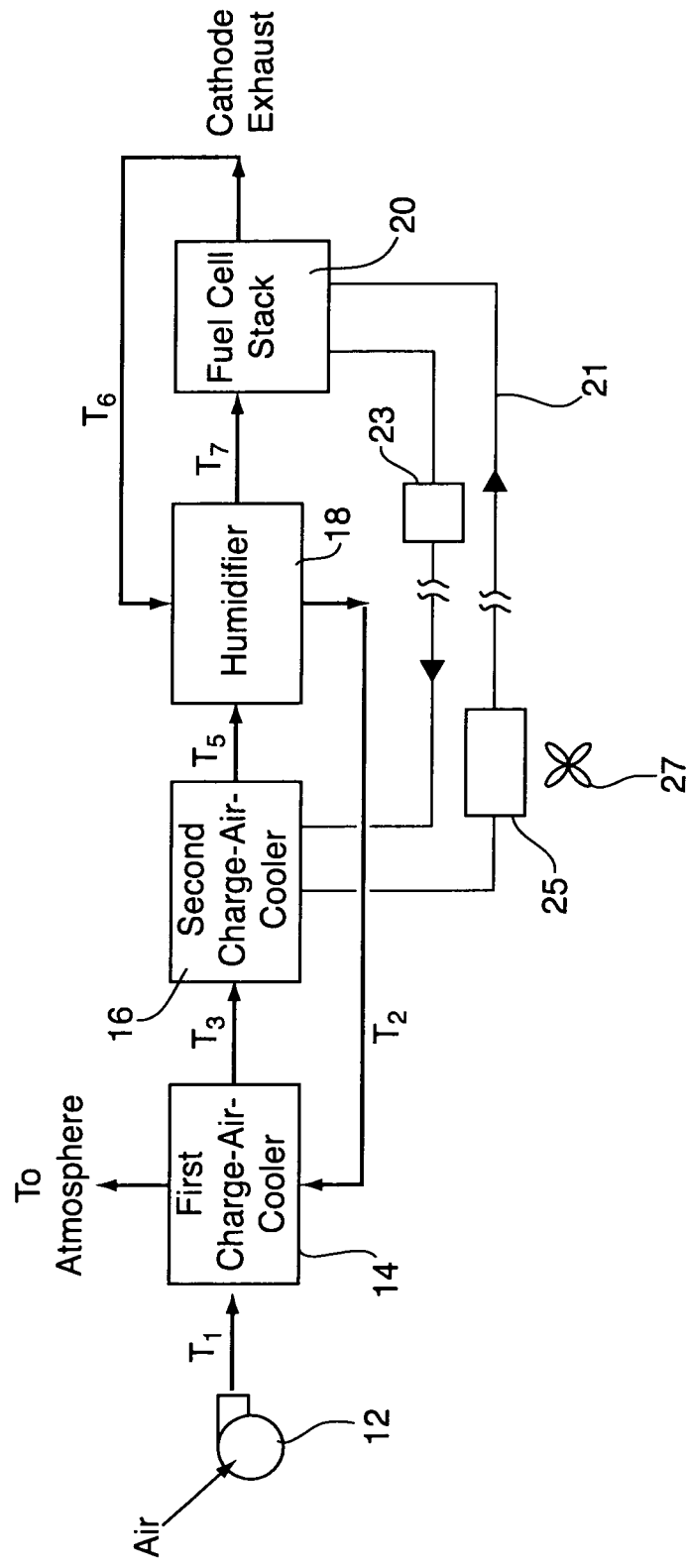
FIG. 1C is a schematic diagram illustrating a method and system for cathode thermal management of a fuel cell system according to a second embodiment of the invention.

The following is a description of the embodiments of the invention illustrated in the drawings.

A method and system for cooling and humidifying a pressurized cathode air stream in a fuel cell system are discussed below with reference to FIGS. 1B and 1C. The following description mentions specific temperatures of various fluid streams within a fuel cell system. It will be appreciated that any temperatures mentioned herein are for the purpose of illustration only, and do not limit the invention. Furthermore, the temperatures disclosed herein are illustrative of fluid temperatures under steady state or normal operating conditions, and there can be significant temperature variations under cold start or other transient conditions. Under normal operating conditions the power level in the fuel cell stack is not radically changing, and most of the exothermic heat generated by the stack is absorbed by the fuel cell's cooling system, with a small amount of the energy of the fuel cell being used to heat up the cathode stream to aid in the uptake of water on the cathode side of the stack.

FIGS. 1B and 1C each schematically illustrate a number of components of a vehicle having a fuel cell engine, especially an automotive fuel cell engine system 10 that uses a pressurized and humidified cathode air supply; and in particular those components which relate to the supply of this air to the cathode of the fuel cell.

The illustrated system 10 comprises an air compressor 12 which receives air at ambient temperature and pressure and compresses the air to a pressure suitable for introduction into the fuel cell stack. The compression of the ambient air causes the temperature of the air to rise from ambient temperature to an elevated temperature, referred to herein as the first temperature $T_1$. In a typical fuel cell system, the compression of ambient air in air compressor 12 produces compressed air having a temperature of about 200° C. The temperature $T_1$ is considerably higher than the operating temperature of the fuel cell (and the maximum tolerable temperature of the humidifier that may be located upstream of the fuel cell), and therefore the pressurized cathode air stream produced by the air compressor 12 must be cooled prior to its introduction into the humidifier and/or fuel cell stack.

The system further comprises a first charge air cooler 14, which is a gas-to-gas charge air cooler. The first charge air cooler 14 receives the pressurized cathode air stream from the air compressor 12. The first charge air cooler 14 includes a cathode air inlet which receives the pressurized cathode air stream at temperature $T_1$, and a cathode air outlet which discharges the pressurized cathode air stream at a third temperature $T_3$, wherein $T_3<T_1$. The first charge air cooler 14 cools the pressurized cathode air stream from $T_1$ to $T_3$ with a gaseous coolant drawn from the fuel cell cathode exhaust and having a second temperature $T_2$, wherein $T_2<T_3<T_1$ under steady state or normal operating conditions of the fuel cell system. There may be some variability in these relative temperatures under cold start and transient conditions.

The first charge air cooler 14 further comprises a coolant inlet to receive the gaseous coolant at temperature $T_2$, and a coolant outlet to discharge the gaseous coolant from the first charge air cooler 14. In an embodiment of the invention, the temperature $T_2$ of the gaseous coolant is from about 90 to 100° C., for example about 94° C., and the gaseous coolant is heated by the pressurized cathode air stream to a temperature of about 175° C. at the coolant outlet of the first charge air cooler 14. The heated gaseous coolant discharged from the first charge air cooler 14 may be released into the environment or used as a heat source elsewhere in the system 10.

The system 10 further comprises a second charge air cooler 16 for cooling the pressurized cathode air stream from temperature $T_3$ to a fifth temperature $T_5$. The second charge air cooler 16 may be a second gas-to-gas charge air cooler, which may use a controlled, variable-speed fan to control temperature $T_5$. Regardless of whether the second charge air cooler 16 uses a liquid or gaseous coolant, the coolant has a fourth temperature $T_4$, wherein $T_4<T_5<T_3$ under steady state or normal operating conditions of the fuel cell system. There may be some variability in these relative temperatures under cold start and transient conditions. Under steady state or normal operating conditions, temperature $T_5$ may be from about 85 to 95° C., for example about 90° C. A variant of system 10 in which the second charge air cooler 16 uses a liquid coolant is described below with reference to FIG. 1C.

The second charge air cooler 16 includes a cathode air inlet which receives the pressurized cathode air stream at temperature $T_3$ and a cathode air outlet which discharges the pressurized cathode air stream at temperature $T_5$. The second charge air cooler 16 further comprises a coolant inlet which receives the gaseous or liquid coolant at temperature $T_4$, and a coolant outlet which discharges the coolant from the second charge air cooler 16.

The second charge air cooler 16 performs a self-stabilizing function, in that it helps to ensure sufficient cooling under a greater range of operating conditions, particularly under certain transient conditions where cooling requirements are sharply increased. This self-stabilizing function ensures sufficient and consistent cooling of the charge air exiting the second charge air cooler 16. This is particularly important in view of the relatively low operating temperatures, and narrow range of operating temperatures, of the fuel cell stack and the membrane humidifier which may be located upstream of the fuel cell stack, both of which have typical average operating temperatures in the range from about 80 to 100° C. It will be appreciated, however, that there may not be any active control over the outlet temperature $T_5$ of the second charge air cooler 16. The relatively constant temperature $T_6$ of the cathode exhaust gas exiting fuel cell stack 20 protects the humidifier from overheating under transient conditions such as acceleration from a steady state (hot) condition with the stack 20 fully warmed, because $T_6$ is less than $T_5$ under such conditions.

Where the second charge air cooler 16 is air cooled, self-stabilization is achieved by providing the second charge air cooler 16 with a variable-speed fan (not shown), the operation of which is controlled by a control circuit which uses a thermistor or thermocouple to monitor the inlet temperature $T_7$ of the fuel cell stack 20 and/or the outlet temperature $T_5$ of the second charge air cooler 16.

Where the second charge air cooler 16 is cooled by water or a water/glycol coolant, self-stabilization is provided by the greater heat capacity of water. For example, as shown in FIG. 1C, the second charge air cooler 16 and the fuel cell stack 20 may be included in a common cooling circuit 21 in which a variable speed pump 23 controls the coolant flow rate through the circuit 21, which includes the primary stack radiator 25 and a variable speed fan 27 provided at the primary stack radiator. The presence of the second charge air cooler 16, with the assistance of the fan 27 and pump 23, help to stabilize the system and maintain the fuel cell stack inlet temperature $T_7$ at a consistent temperature under variable operating conditions or in the event of a malfunction of another component within the system 10. To ensure accurate temperature control of the fuel cell stack 20, the radiator 25 and fan 27 are shown in FIG. 1C as being located upstream of the stack 20, and may for example be directly upstream of stack 20, such that the temperature of the liquid coolant exiting radiator 25 may be essentially the same as the temperature of the liquid coolant received by stack 20.

The stack inlet temperature $T_7$ may be actively controlled, eg. by sensors and control loops (not shown). The stack inlet and outlet temperatures $T_7$ and $T_6$ are measured by the sensors and the coolant flow in the common cooling circuit 21 is increased by increasing the speed of the pump 23 if $T_6$ is too high. This increases cooling at both the stack 20 and the second charge air cooler 16. Conversely, where T7 is too low, the coolant flow in the circuit 21 is reduced by reducing the speed of pump 23, which simultaneously reduces cooling of both the stack 20 and the second charge air cooler 16.

The system 10 further comprises a gas-to-gas humidifier 18 for increasing the water content of the pressurized cathode air stream to a humidity level which is acceptable for introduction into the fuel cell stack. In an embodiment, the gas-to-gas humidifier 18 may comprise a membrane humidifier as described in U.S. Patent Application Publication No. US 2012/0181712 A1, which is incorporated herein by reference in its entirety.

The humidifier 18 includes a cathode air inlet for receiving the pressurized cathode air stream having a relatively low humidity level, and a cathode air outlet for discharging the pressurized cathode air stream at a relatively higher humidity level. The humidifier 18 further comprises a humidifying gas inlet to receive a gas which contains water to be transferred to the pressurized cathode air stream, and a humidifying gas outlet for discharging the moisture-depleted humidifying gas from humidifier 18.

After the pressurized cathode air stream has been cooled and humidified, it flows to a fuel cell stack 20 having a cathode air inlet for receiving the pressurized cathode air stream, and a cathode exhaust gas outlet for discharging a cathode exhaust gas produced by chemical reactions taking place within the fuel cell stack. The fuel cell stack 20 may be considered a component of system 10, or may be considered a separate component of a fuel cell system.

The relatively large surface area of humidifier 18 makes it an effective heat exchanger, and its location immediately ahead of the fuel cell stack 20 helps to stabilize system 10 and maintain a consistent inlet temperature at the fuel cell stack 12 in the event of temperature spikes in the pressurized cathode air stream caused by transient conditions or a malfunction in the system 10. Thus, a second level of self-stabilization is provided by the humidifier 18, which relies on the relatively stable temperature $T_6$ of the cathode exhaust gas to deal with any transient temperature excursions in the pressurized cathode air system that survive the first level of stabilizing at the second charge air cooler 16.

In the embodiment shown in FIG. 1, the first and second charge air coolers are arranged sequentially such that the second charge air cooler 16 receives the pressurized cathode air stream at temperature $T_3$ from the first charge air cooler 14. Locating the first charge air cooler 14 upstream (i.e. in the direction of flow of the pressurized cathode air stream) relative to the second charge air cooler 16 can be advantageous, particularly where the second charge air cooler 16 is a liquid-to-gas charge air cooler sharing coolant with other heat-producing components of the fuel cell system. Under normal operating conditions, most of the thermal energy removed from the pressurized cathode air stream will be removed by the first charge air cooler 14, and a lesser amount of thermal energy is removed from the pressurized cathode air stream by the second charge air cooler 16. As a result, most of the waste heat from the charge air stream is rejected to the atmosphere rather than being absorbed by the fuel cell cooling system, at least under normal operating conditions. This can produce several benefits. For example, the use of the system and method of the present invention in a fuel cell system can help reduce thermal load on the fuel cell engine's cooling system, and may permit the use of a smaller radiator, saving space in the front end of the vehicle. At the same time, the cooling system can satisfy greater cooling demands of the cathode air stream under transient conditions. The system and method of the invention can also reduce parasitic energy losses in the cooling system of the fuel cell engine, such as losses due to operation of the radiator fan, by diverting more thermal load of the total system away from the liquid cooling system.

An additional benefit of the system and method of the invention, compared to standard practice, is that the fuel cell cathode exhaust is no longer discharged to atmosphere at approximately 80-90° C., a temperature low enough to cause water condensation and pooling of water or ice (in winter operation) underneath the vehicle. Instead, the system and method of the invention cause the fuel cell exhaust to be heated to a higher temperature after being used to cool the charge air stream. Exhausting the heated exhaust to ambient air at a higher temperature can avoid local condensation and water or ice pooling.

In an example, compression of the cathode air stream adds 14.5 kW of thermal energy into the cathode air stream, and about 10.5 kW of waste heat is removed from the compressed cathode air stream. The first charge air cooler removes about 10 kW of thermal energy and the second charge air cooler 16 removes about 0.5 kW of thermal energy. This is a reduction of about 10 kW of heat which would otherwise be rejected to the fuel cell liquid cooling system Once it is cooled to temperature $T_5$, the pressurized cathode air stream flows from the second charge air cooler 16 to the gas-to-gas humidifier 18.

The cathode exhaust gas stream exiting the fuel cell stack 20 typically has a temperature of about 90 to 100° C., which is slightly higher than the temperature of the pressurized cathode air stream entering the fuel cell stack 20. In addition, due to the production of water within the fuel cell stack, the moisture level of the cathode exhaust gas stream is relatively high. Accordingly, in the present invention, the humidifying gas flowing through the humidifier 18 comprises the cathode exhaust gas stream from the cathode exhaust gas outlet of the fuel cell stack 20. The removal of water from the fuel cell exhaust by the humidifier 18 also reduces the relative humidity of the exhaust.

There may also be a relatively small amount of heat exchange taking place in the humidifier 18. For example, as mentioned above, the temperature of the cathode exhaust gas exiting fuel cell stack 20 (represented by $T_6$ in FIG. 1) is typically slightly higher than that of the pressurized cathode air stream (represented by $T_7$ in FIG. 1) supplied to the fuel cell stack 20 from humidifier 18. In an embodiment of the invention, $T_6$ is about 95 to 100° C., for example about 96° C., whereas $T_7$ is typically from about 90 to 95° C., for example about 92° C., wherein $T_5<T_7<T_6$. Again, these are typical temperatures within the fuel cell system during steady state or normal operation, and may be different under cold start and transient conditions.

Thus, the cathode exhaust gas stream enters humidifier 18 at a slightly elevated temperature $T_6$ and is slightly cooled by the pressurized cathode air stream entering humidifier 18 at temperature $T_5$. As a result, the cathode exhaust gas stream may exit humidifier 18 at a slightly lower temperature $T_2$ than the temperature $T_6$ at the outlet of the fuel cell stack 20. It can be seen from the above discussion that the use of the cathode exhaust gas stream as a cooling and/or humidifying gas cools the pressurized cathode air stream to a temperature suitable for use in the fuel cell, and over-cooling or under-cooling of the cathode air stream can be avoided.

As shown in FIG. 1, the cathode exhaust gas stream exits humidifier 18 at temperature $T_2$ and flows to the gas-to-gas charge air cooler 14 which may be located immediately downstream of the air compressor 12.

A method for cooling and humidifying a pressurized cathode air stream is now described below, in accordance with FIG. 1.

As mentioned above, the fuel cell system may comprise the fuel cell stack 20, the first charge air cooler 14, the second charge air cooler 16, and the gas-to-gas humidifier 18.

According to the invention, a pressurized cathode air stream is provided at a temperature $T_1$, for example from an air compressor 12. The pressurized cathode air stream is then passed through the gas-to-gas charge air cooler 14 and transfers heat to a cathode exhaust gas stream from the fuel cell stack 20. The cathode exhaust gas stream has a second temperature $T_2$ at an inlet of the first charge air cooler 14 and the pressurized cathode air stream is thereby cooled to a third temperature $T_3$ at an outlet of the first charge air cooler 14, wherein $T_2<T_3<T_1$ under steady state or normal operating conditions.

The pressurized cathode air stream is then passed through the second charge air cooler 16 and transfers heat to a gaseous or liquid coolant having a temperature $T_4$ at an inlet of the second charge air cooler 16. The pressurized cathode air stream is thereby cooled to a temperature $T_5$ at an outlet of the second charge air cooler 16, wherein $T_4<T_5<T_3$ under steady state or normal operating conditions.

The pressurized cathode air stream is then passed through the gas-to-gas humidifier 18, where the water content of the pressurized cathode air stream absorbs water from the cathode exhaust gas stream.

Once the pressurized cathode air stream has been cooled and humidified as described above, it is passed to a cathode air inlet of the fuel cell stack 20.

Having now described a system and method for cooling and humidifying a pressurized cathode air stream, the following is a description of three-fluid charge air coolers according to the invention, which integrate the first charge air cooler 14 and the second charge air cooler 16 schematically shown in FIG. 1. Although the three-fluid charge air coolers described herein are adapted for use in the system and method according to the invention, they may be used in numerous other applications for cooling of a hot gas stream.

A three-fluid charge air cooler 100 according to a first embodiment of the invention is now described below with reference to FIGS. 2 to 11. The drawings illustrate a portion of the core 22 of heat exchanger 100. It will be appreciated that the heat exchanger 100 will also include other components such as a top plate, a bottom plate, a base plate for mounting heat exchanger 100 to another vehicle component, inlet and outlet fittings for the charge air and the coolants, none of which are shown in the drawings. These components are conventional and their appearance and location may be at least partially dictated by space limitations. For example, the specific locations and configurations of the inlet and outlet openings and fittings for the charge air and the coolants depend on the specific configuration of the vehicle's air intake system and the fuel cell system, and will vary from one application to another.

The core 22 is "self-enclosed", meaning that the manifolds and flow passages are completely enclosed within the stack of plates from which core 22 is formed, and therefore the core 22 of heat exchanger 100 does not need to be enclosed within a separate housing.

The core 22 is made up of a plurality of plates which are joined together (for example by brazing) in order to form alternating flow passages for the charge air and the coolants.

Core 22 includes a plurality of first core plates 24, a plurality of second core plates 26, and a plurality of flat separator plates 28.

Figure 2:
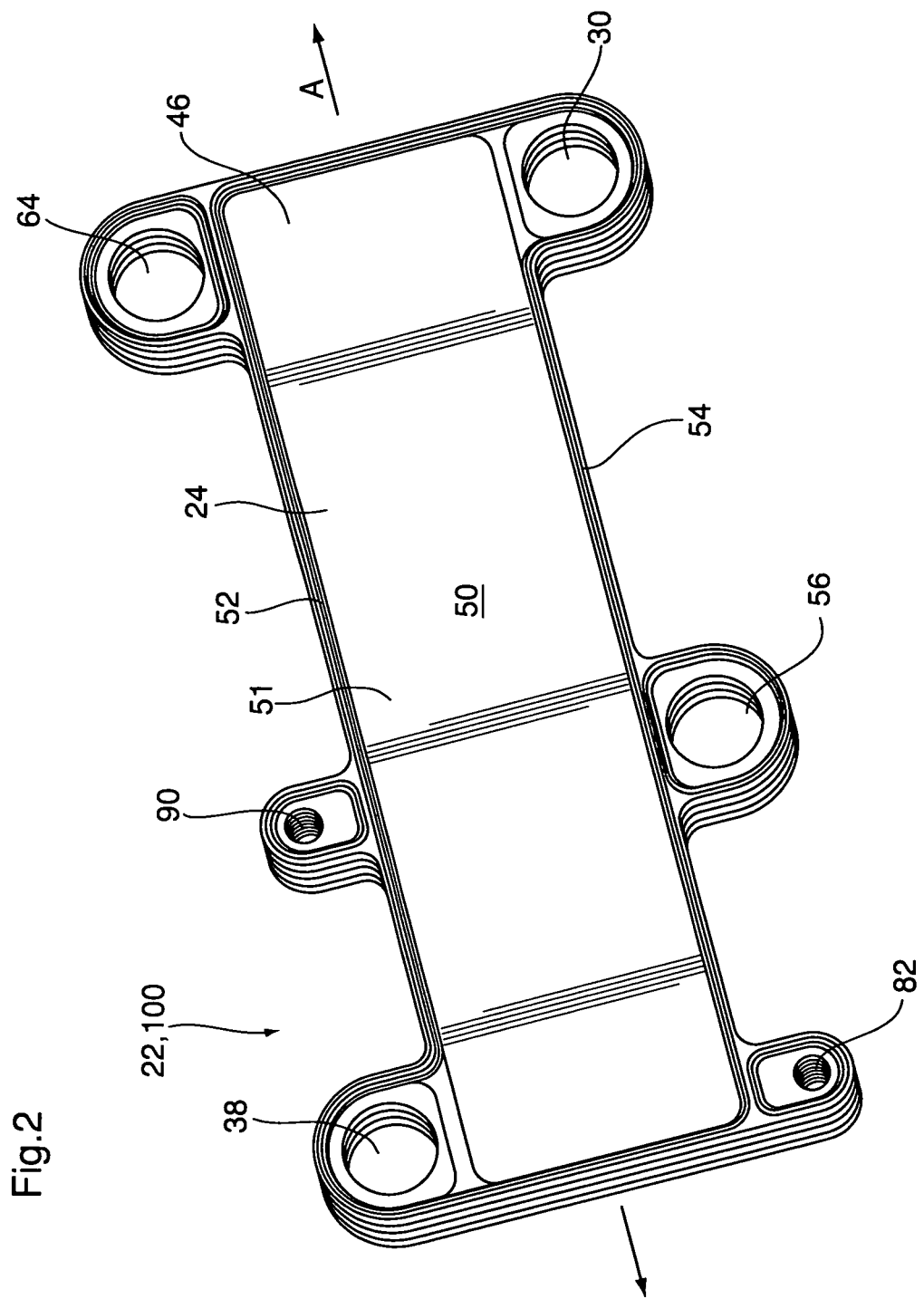
FIG. 2 is a top perspective view of the core of a heat exchanger according to a first embodiment.
Figure 3:
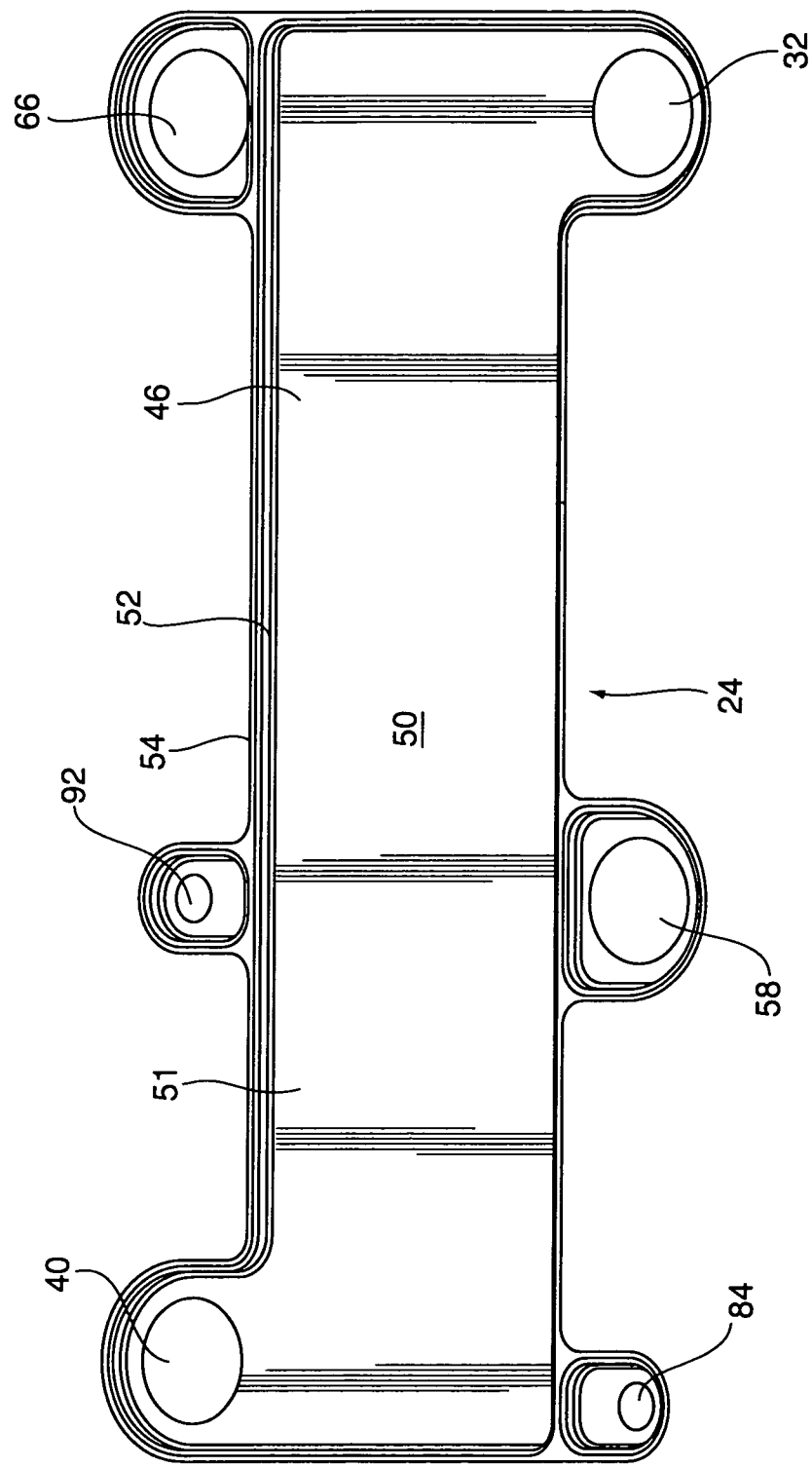
FIG. 3 is a top perspective view of a first core plate thereof.
Figure 4:
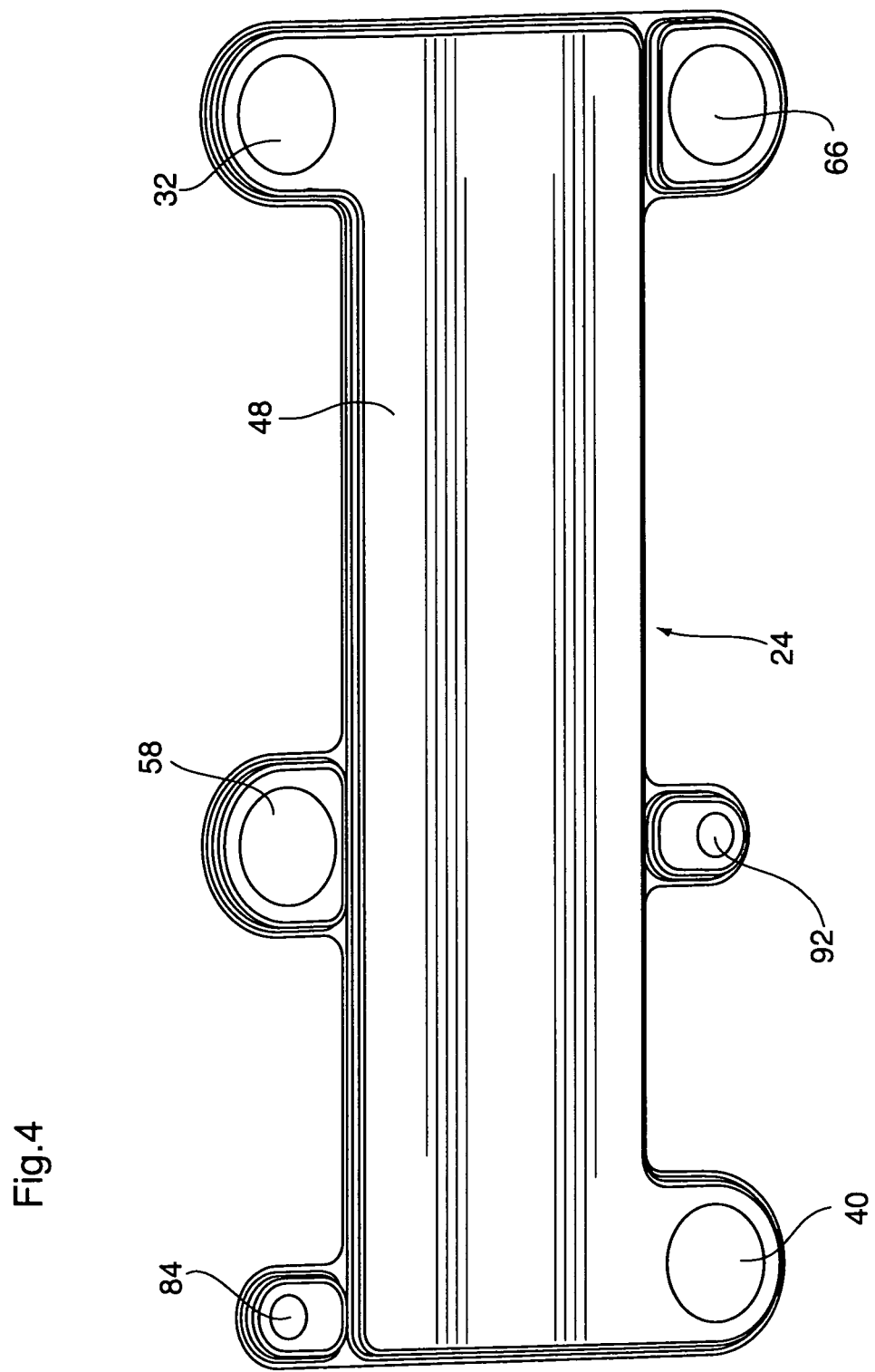
FIG. 4 is a bottom perspective view of the first core plate.

The plates 24, 26, 28 and the core 22 are elongate, and define a longitudinal axis A shown in FIG. 2. All of the plates and the core 22 include elongate sides which are at least generally parallel to axis A and relatively shorter ends which are transverse to axis A.

Heat exchanger 100 includes a charge air inlet manifold 30 which, in the illustrated embodiment, is located along a longitudinal side of core 22, adjacent to a corner, and is made up of aligned charge air inlet openings 32, 34 and 36 in respective core plates 24, 26 and 28. The charge air inlet manifold 30 extends throughout the entire height of core 22. In the assembled heat exchanger 100, one end of charge air inlet manifold 30 will be blocked by a top or bottom plate and the other end of charge air inlet manifold 30 will receive hot, pressurized charge air from air compressor 12 through an inlet fitting (not shown). It will be appreciated that the precise location, shape and appearance of the charge air inlet manifold 30 may vary from that shown in the drawings.

A charge air outlet manifold 38 is located along a side of core 22, adjacent to a corner. The charge air inlet manifold 30 and charge air outlet manifold 38 are located adjacent to opposite ends of the core 22 and, as shown, may be located at diagonally opposite corners of core 22. The charge air outlet manifold 38 is made up of aligned charge air outlet openings 40, 42 and 44 of respective core plates 24, 26 and 28. The charge air outlet manifold 38 extends throughout the entire height of core 22. One end of charge air outlet manifold 38 will be blocked by a top or bottom plate (not shown), and the opposite end will be provided with an outlet fitting (not shown) for discharging the cooled charge air to the gas-to-gas humidifier 18. The precise location, shape and appearance of the charge air outlet manifold 38 shown in the drawings is not essential. It is sufficient that the charge air inlet and outlet manifolds 30 and 38 are located at opposite ends of core 22, regardless of whether they are directly opposite or diagonally opposite to one another. For example, the charge air inlet and outlet manifolds 30, 38 may be located along the same side of core 22, rather than at diagonally opposed corners, or they may be located at any point along the ends of the core 22.

The first core plate 24 has a top face 46 and a bottom face 48. Looking at top face 46, shown in FIG. 2, first core plate 24 has a plate bottom 50 which is co-planar with the charge air inlet opening 32 and the charge air outlet opening 40 of first core plate 24. The plate bottom 50 and the outer periphery of first core plate 24 are surrounded by an upstanding wall 52 having a planar, upper sealing surface 54 for sealing to an adjacent plate. The upstanding wall 52 includes an outer peripheral portion which encloses the outer periphery of first core plate 24, and upstanding ribs which separate the coolant manifolds (described below) from the plate bottom 50. The upper sealing surface 54 of first core plate 24 includes an outer peripheral flange which extends along the outer peripheral portion of upstanding wall 52, as well as planar sealing surfaces on the upstanding rib portions of upstanding wall 52. The pressurized charge air flows diagonally and longitudinally across the plate bottom 50 along the top face 46 of first core plate 24 from the charge air inlet opening 32 to the charge air outlet opening 40. Thus, a charge air flow passage 51 is defined along the rectangular area of the plate bottom 50.

The core 22 of heat exchanger 100 also includes a gaseous coolant inlet manifold 56 which is made up of gaseous coolant inlet openings 58, 60 and 62 of respective core plates 24, 26 and 28. The gaseous coolant inlet manifold 56 is located along a side of the core 22, partway between the ends, for reasons which will become apparent below. As with the charge air manifolds, the gaseous coolant inlet manifold 56 will be closed at one end by a top or bottom plate, and the opposite end of gaseous coolant inlet manifold 56 will be provided with an inlet fitting for receiving a gaseous coolant. For example, where the gaseous coolant is a cathode exhaust gas stream, the gaseous coolant inlet will be configured to receive the cathode exhaust gas stream either directly or indirectly from the fuel cell stack 20. It will be appreciated that the precise location and appearance of the gaseous coolant inlet manifold 56 may vary from that shown in the drawings.

The core 22 further comprises a gaseous coolant outlet manifold 64 which is made up of aligned gaseous coolant outlet openings 66, 68 and 70 of respective core plates 24, 26 and 28. The gaseous coolant outlet manifold 64 is located along a side of the core 22, proximate to one of the ends thereof. In the illustrated embodiment, the gaseous coolant outlet manifold 64 is located at a corner of the core 22, diagonally opposite from the gaseous coolant inlet manifold, although diagonal arrangement is not required. It will be appreciated that one end of the gaseous coolant outlet manifold 64 will be blocked by a top or bottom plate of heat exchanger 100, and the opposite end of gaseous coolant outlet manifold 64 will be provided with an outlet fitting through which the gaseous coolant is discharged from the heat exchanger 100. The gaseous coolant, which is heated to an elevated temperature by heat exchange with the charge air, may either be discharged to the atmosphere or may be used elsewhere in the fuel cell system.

Figure 5:
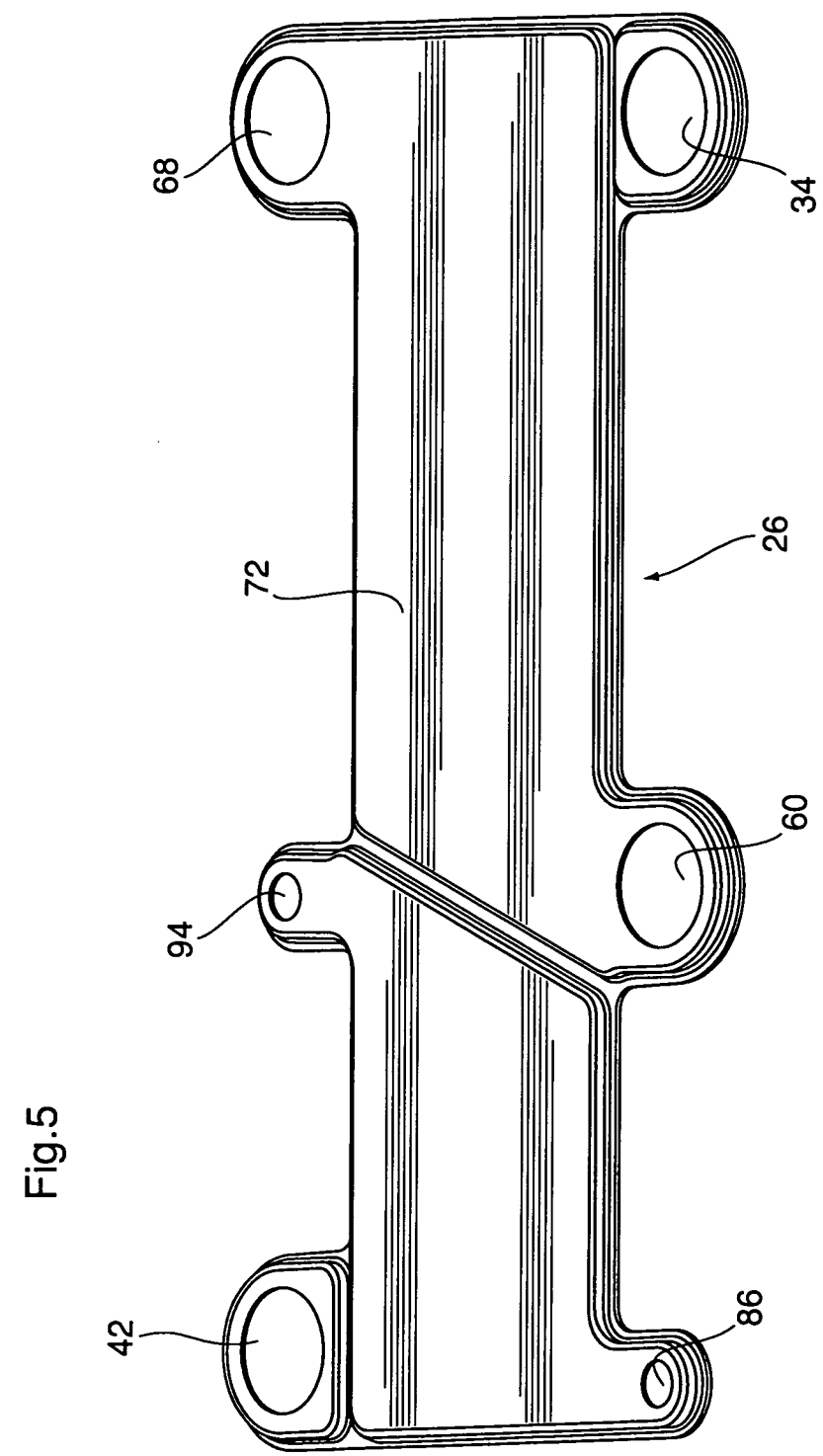
FIG. 5 is a top perspective view of a second core plate thereof.
Figure 6:
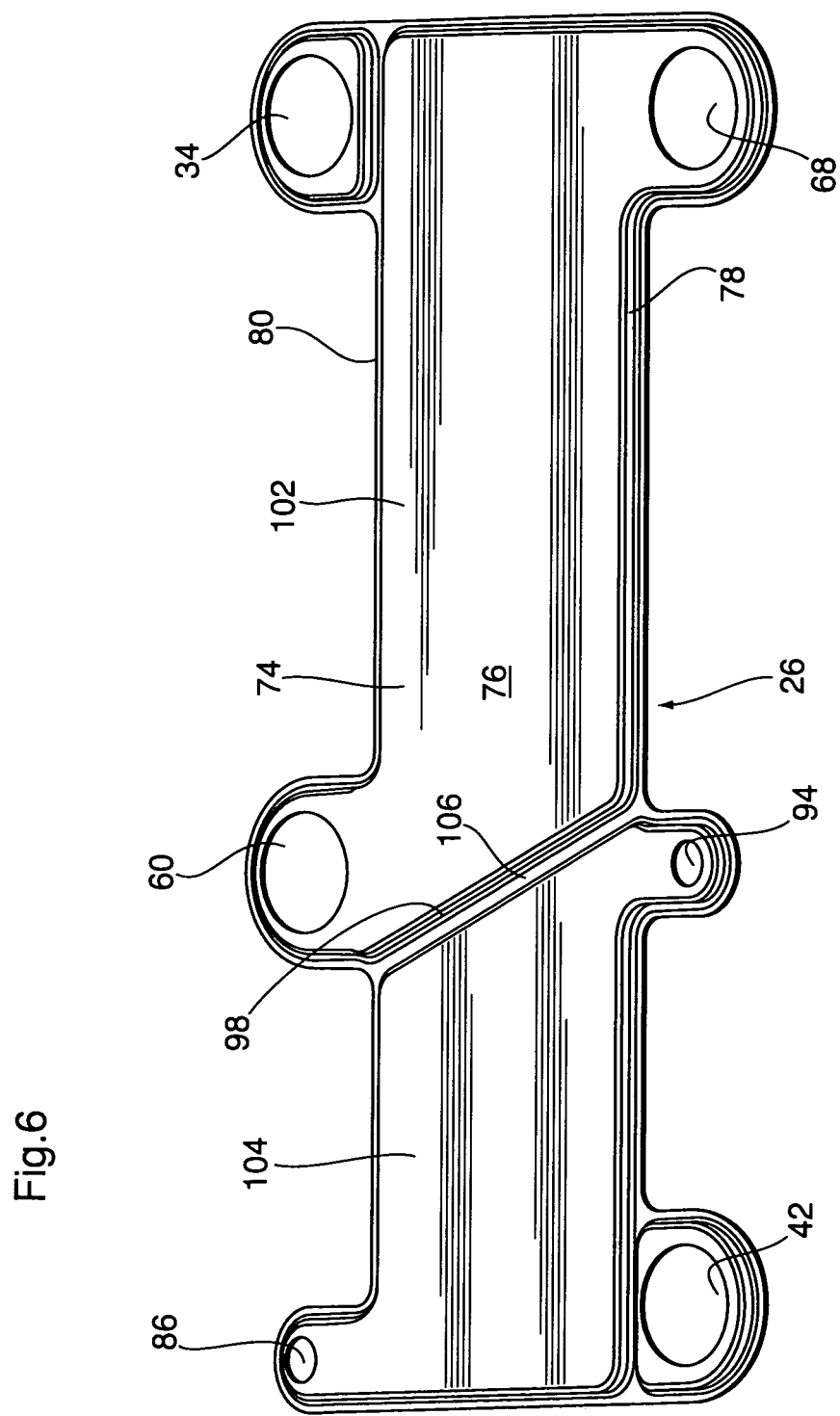
FIG. 6 is a bottom perspective view of the second core plate.
Figure 7:
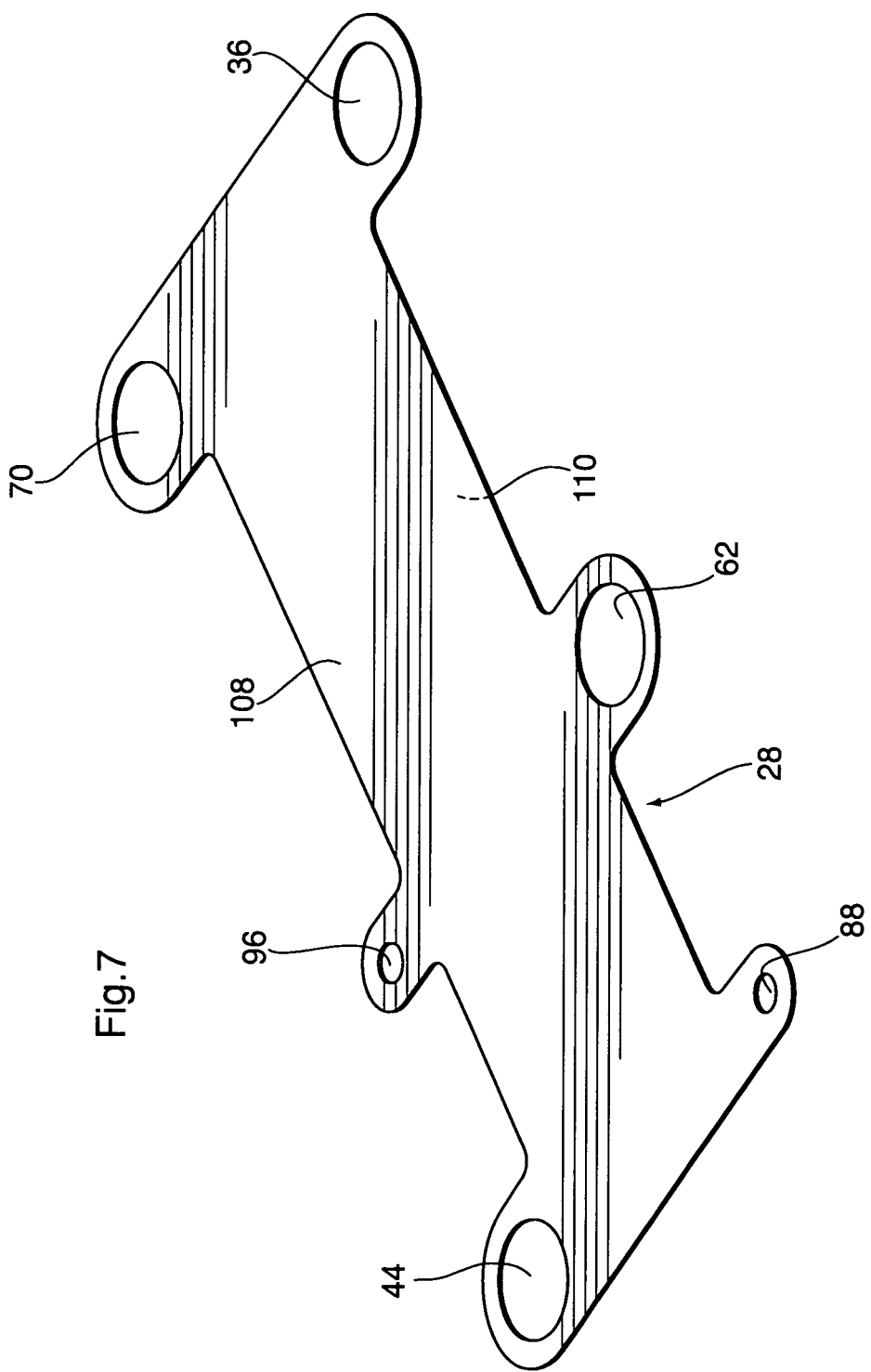
FIG. 7 is a top perspective view of a separator plate.

The second core plate 26 has a top face 72 and a bottom face 74. In the assembled core 22, the top face 72 of second core plate 26 is secured and sealed to the bottom face 48 of an adjacent first core plate 24 in the core 22, for example by brazing. Referring to FIG. 5, the second core plate 26 has a plate bottom 76 which is co-planar with the gaseous coolant inlet opening 60 and the gaseous coolant outlet opening 68. The plate bottom 76 and the outer periphery of second core plate 26 are surrounded by a downwardly extending wall 78 provided with a lower, planar sealing surface 80 for sealing to an adjacent first core plate 24. The downwardly extending wall 78 includes an outer peripheral portion which encloses the outer periphery of second core plate 26, and downwardly extending ribs which separate the charge air manifolds 30 and 38 from the plate bottom 76. The lower sealing surface 80 of second core plate 26 includes an outer peripheral flange which extends along the outer peripheral portion of downwardly extending wall 78, as well as planar sealing surfaces on the downwardly extending ribs of downwardly extending wall 78. It can be seen that the gaseous coolant will flow from the gaseous coolant inlet opening 60, diagonally along the plate bottom 76 on the bottom face 74 of second core plate 26, to the gaseous coolant outlet opening 68. In the illustrated embodiment, the gaseous coolant and the charge air flow in opposite directions along axis A.

The core 22 of heat exchanger 100 also includes a liquid coolant inlet manifold 82 which is made up of aligned liquid coolant inlet openings 84, 86 and 88 in respective core plates 24, 26 and 28. One end of the liquid coolant inlet manifold 82 will be blocked by a top or bottom plate, and the opposite end of liquid coolant inlet manifold 82 will be provided with an inlet fitting for receiving the liquid coolant from a coolant source. The liquid coolant inlet manifold 82 is located along a side of core 22, proximate to an end of core 22, and is shown in the drawings as being located at a corner of core 22. It will be appreciated that the precise location, shape and appearance of the liquid coolant inlet manifold 82 may vary from that shown in the drawings.

The core 22 also includes a liquid coolant outlet manifold 90 made up of aligned liquid coolant outlet openings 92, 94 and 96 of the respective core plates 24, 26 and 28. The liquid coolant outlet manifold 90 is located along a side of core 22, partway between the ends, and in the illustrated embodiment, is located directly across the core 22 from the gaseous coolant inlet manifold 56.

Referring again to the bottom face 74 of the second core plate 26 shown in FIG. 5, it can be seen that the liquid coolant inlet opening 86 and the liquid coolant outlet opening 94 are co-planar with the plate bottom 76, and are also surrounded by the downwardly extending peripheral wall 78. Thus, the liquid coolant will flow from the liquid coolant inlet opening 86, along the plate bottom 76 on the bottom face 74 of second core plate 26, to the liquid coolant outlet opening 94. The liquid coolant therefore flows diagonally and longitudinally along the plate bottom 76, opposite the direction of flow of the charge air.

It can be seen that both the gaseous coolant and the liquid coolant flow along the plate bottom 76 on the bottom face 74 of second core plate 26. Therefore, the flow passages for the liquid and gaseous coolants are co-planar with one another. In order to physically separate the liquid coolant flow from the gaseous coolant flow, the plate bottom 76 of second core plate 26 is provided with a downwardly extending rib 98 which extends substantially transversely between opposite sides of the second core plate 26, and divides the plate bottom 76 into a gaseous coolant flow passage 102 and a liquid coolant flow passage 104. The rib 98 has a height which is the same as the height of the downwardly extending peripheral wall 78 of second core plate 26, with a flat lower sealing surface 106 which is co-planar with, and joined to, the lower sealing surface 80.

As mentioned above, the bottom face 48 of each first core plate 24 in the core 22 is secured and sealed to the top face 72 of an adjacent second core plate 26. Therefore, in the core 22, the top face 46 of each first core plate 24 faces the bottom face 74 of an adjacent second core plate 26. In order to separate the charge air flow passage 51 along the plate bottom 50 of first core plate 24 from the coolant flow passages 102, 104 along the plate bottom 76 of second core plate 26, a thin, flat separator plate 28 is provided between the top face 46 of each first core plate 24 and the bottom face 74 of each second core plate 26. The separator plate 28 has openings for each of the manifolds, as well as a flat top face 108 which is sealed to the lower sealing surface 80 and the lower sealing surface 106 of the rib 98 of the second core plate 26, and a flat bottom face 110 which is sealed against the upper sealing surface 54 of the first core plate 24, for example by brazing. Thus, heat exchange between the charge air and the coolants takes place through the flat separator plate 28.

The core 22 of heat exchanger 100 is shown as having manifolds which bulge out from the sides of the core 22. It will be appreciated, however, that this configuration is not essential. Rather, the overall shape of the core may be rectangular, with the manifolds located within the rectangular area of the core 22.

Although not shown in the drawings, some or all of the charge air flow passages 51 and the coolant flow passages 102, 104 in core 22 may be provided with a turbulence-enhancing insert such as a turbulizer or a corrugated fin. Each turbulizer or fin is received between separator plate 28 and the plate bottom 50 or 76 of a core plate 24 or 26, and may be secured on one or both sides by brazing. As used herein, the terms "corrugated fin" and "turbulizer" are intended to refer to corrugated turbulence-enhancing inserts having a plurality of axially-extending ridges or crests connected by sidewalls, with the ridges being rounded or flat. As defined herein, a "fin" has continuous ridges whereas a "turbulizer" has ridges which are interrupted along their length, so that axial flow through the turbulizer is tortuous. Turbulizers are sometimes referred to as offset or lanced strip fins, and examples of such turbulizers are described in U.S. Pat. No. RE.35,890 (So) and U.S. Pat. No. 6,273,183 (So et al.). The patents to So and So et al. are incorporated herein by reference in their entireties. Where a fin or turbulizer is provided in the charge air flow passage 51, it will cover substantially the entire rectangular area of plate bottom 50. Similarly, fins or turbulizers may be provided along the plate bottom 76 of second core plate 26 in the gaseous and liquid coolant flow passages 102, 104.

Figure 8:
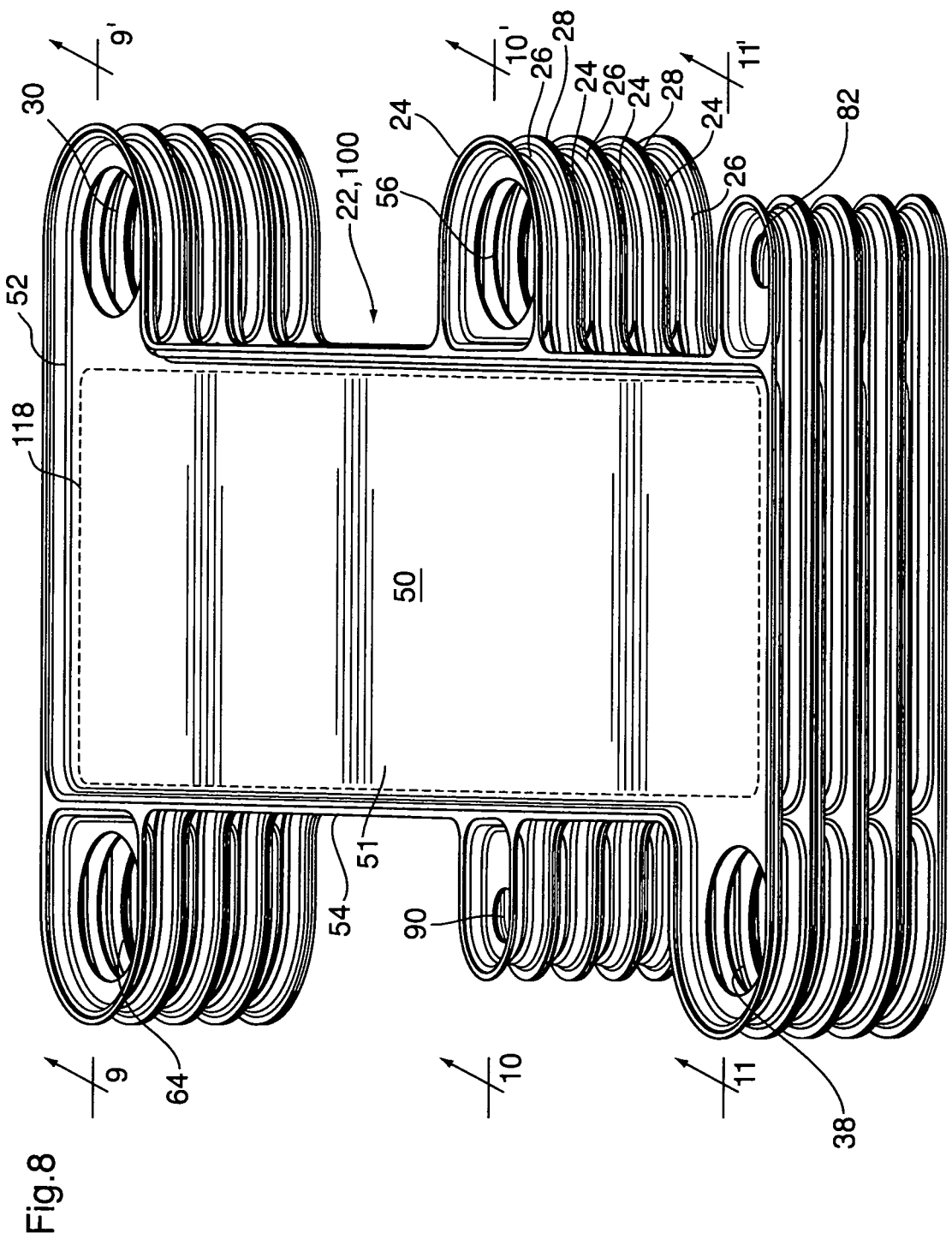
FIG. 8 is a top, front perspective view of the heat exchanger core of the first embodiment.
Figure 9:
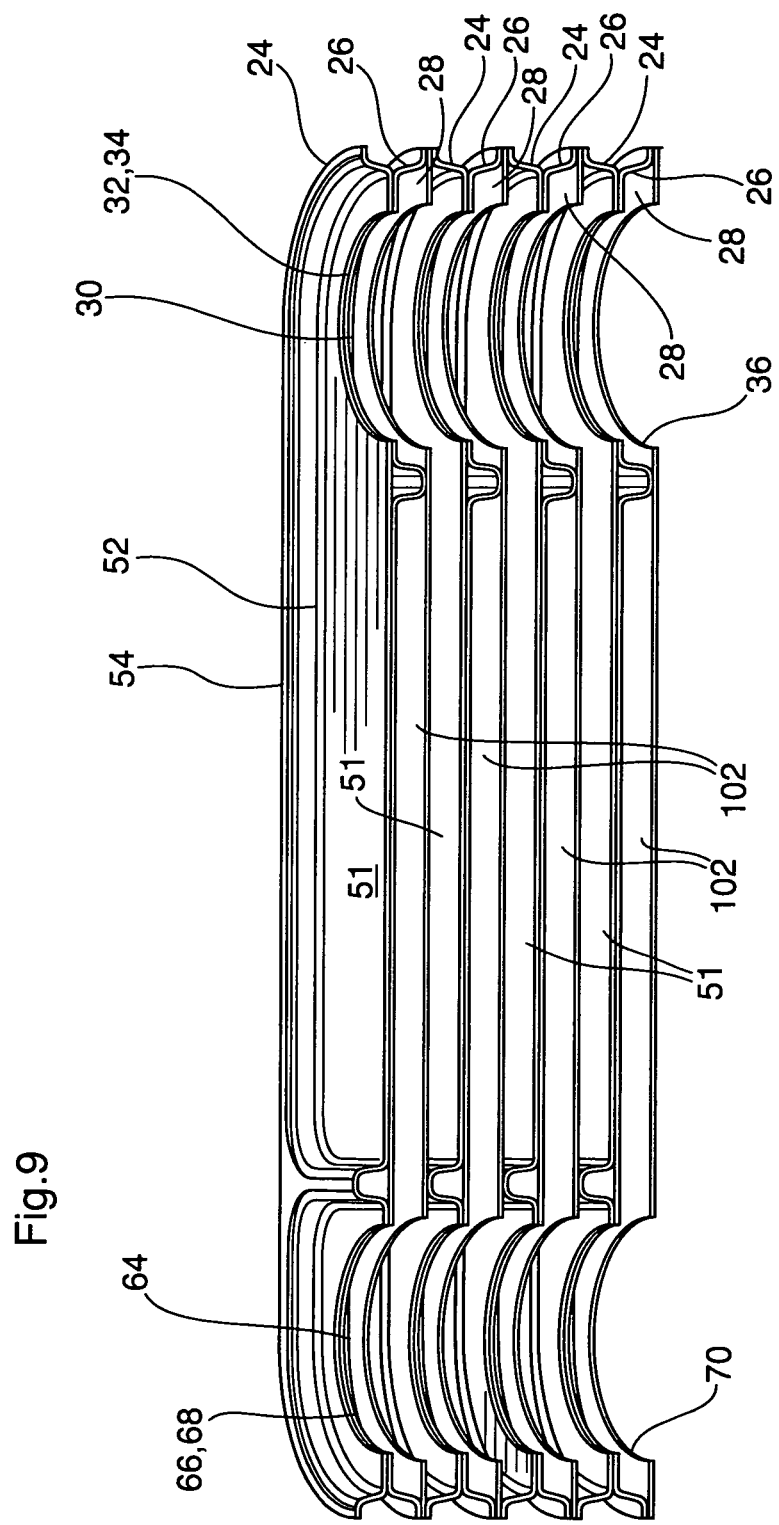
FIG. 9 is a transverse cross section along line 9-9' of FIG. 8.
Figure 10:
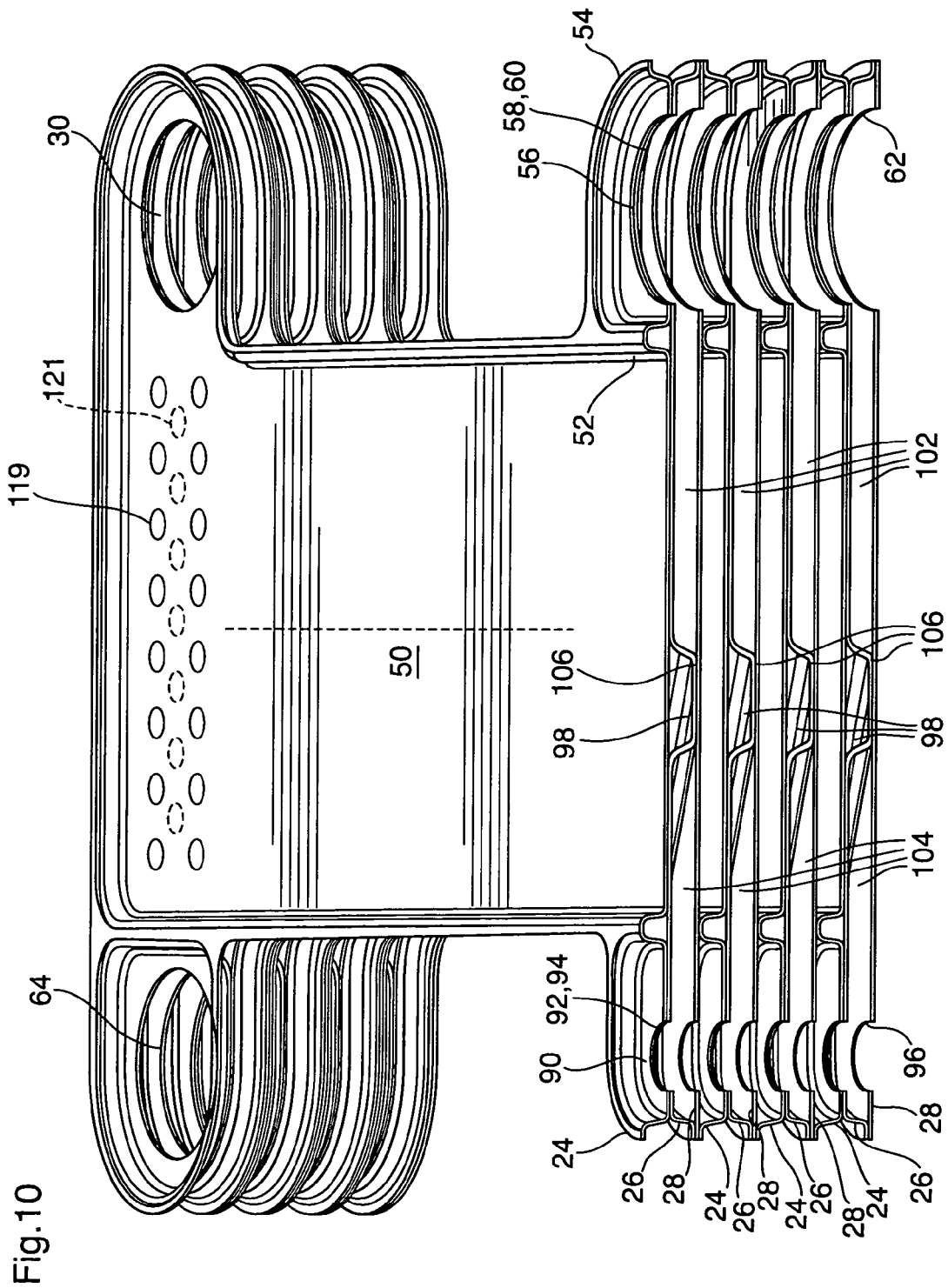
FIG. 10 is a transverse cross section along line 10-10' of FIG. 8.
Figure 11:
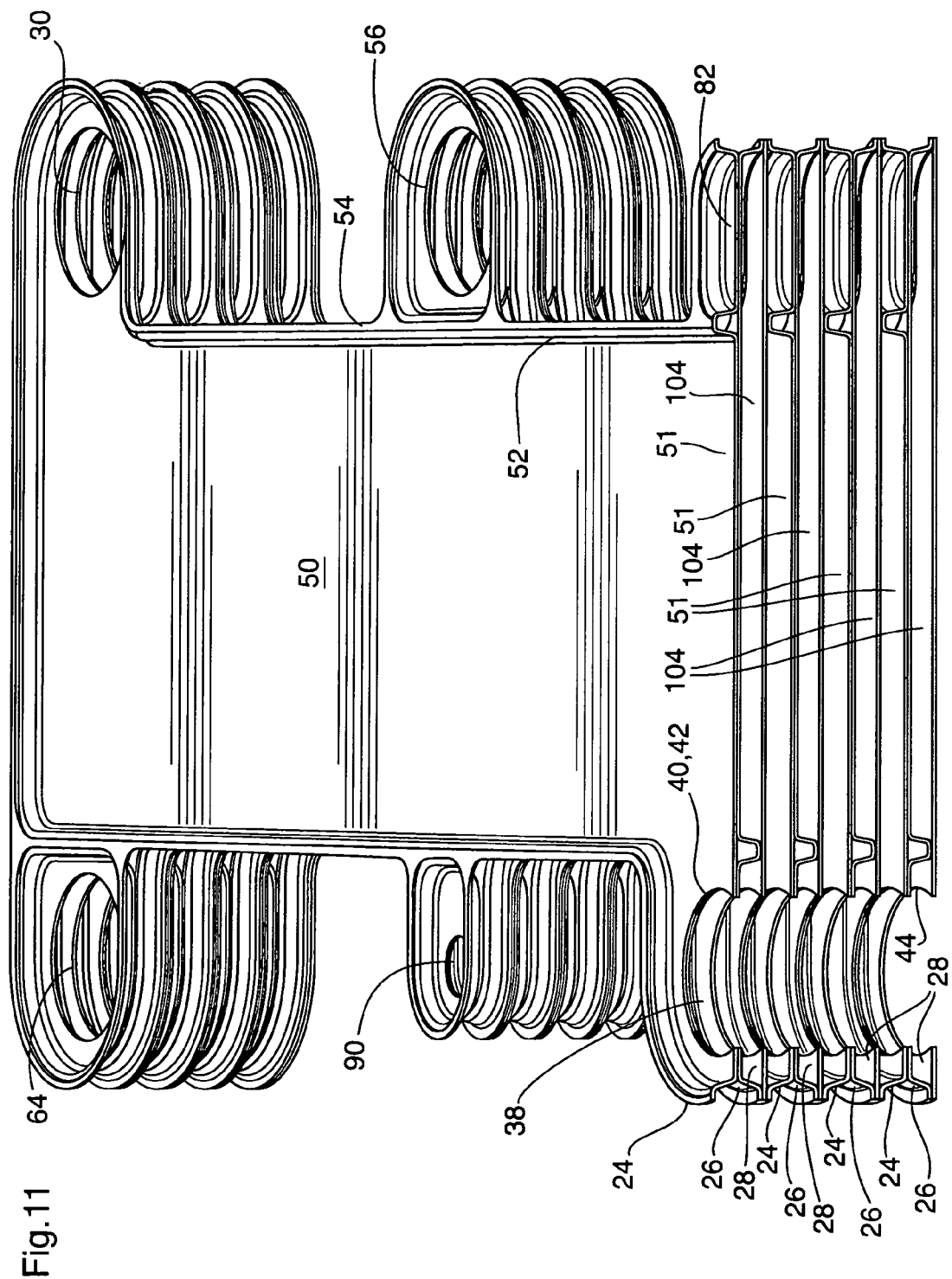
FIG. 11 is a transverse cross section along line 11-11' of FIG. 8.
Figure 12:
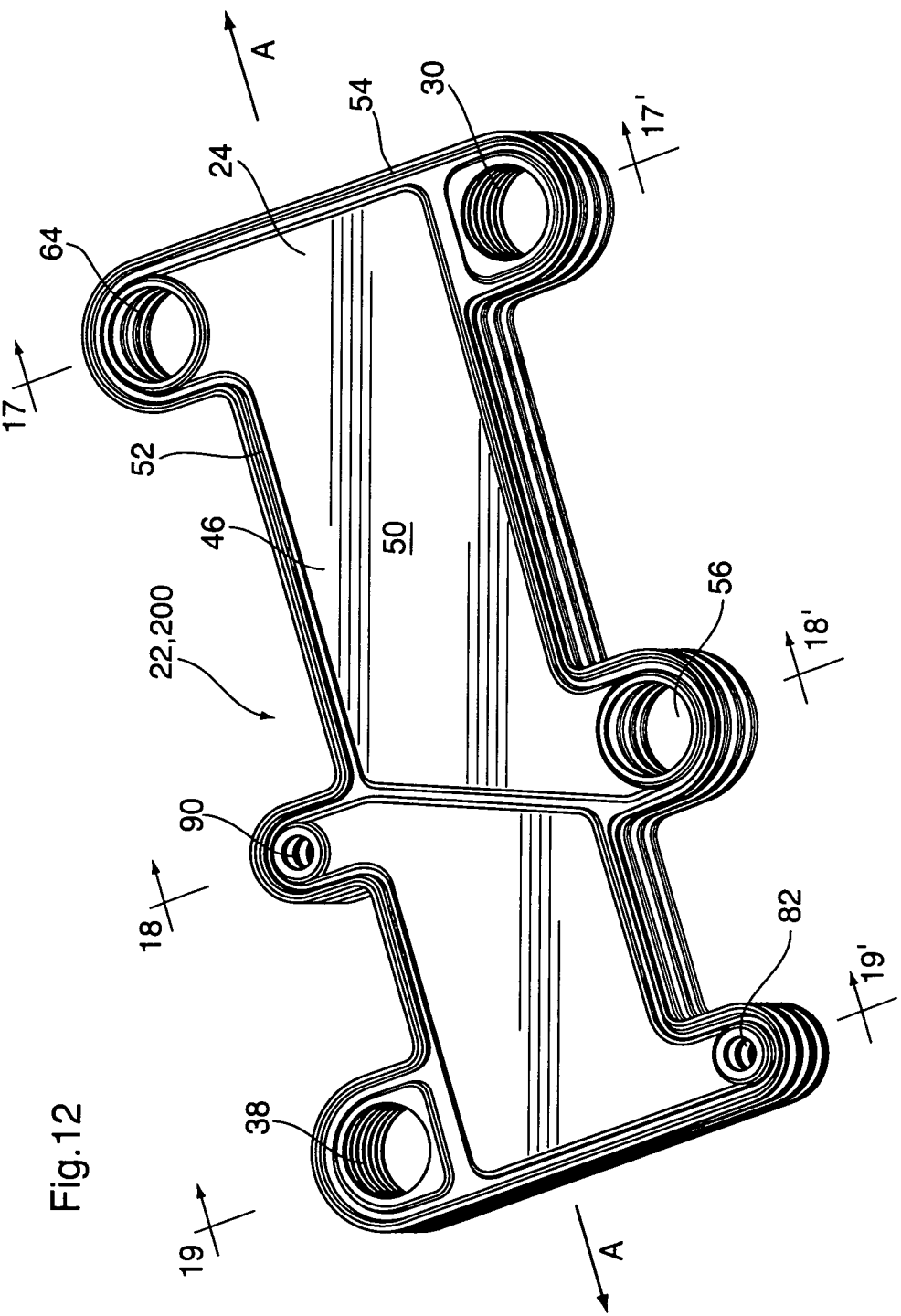
FIG. 12 is a top perspective view of the core of a heat exchanger according to a second embodiment.
Figure 13:
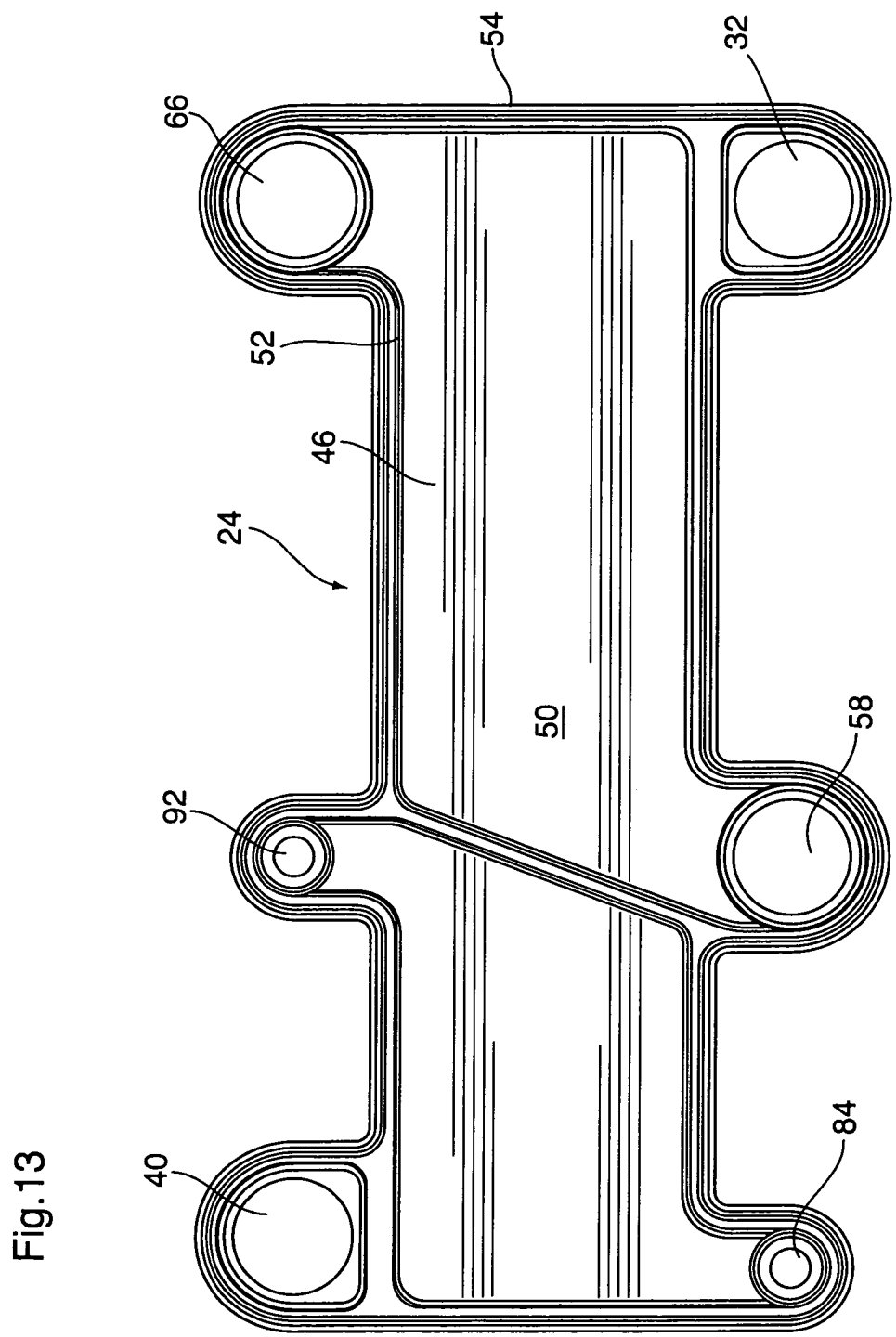
FIG. 13 is a top plan view of a first core plate thereof.
Figure 14:
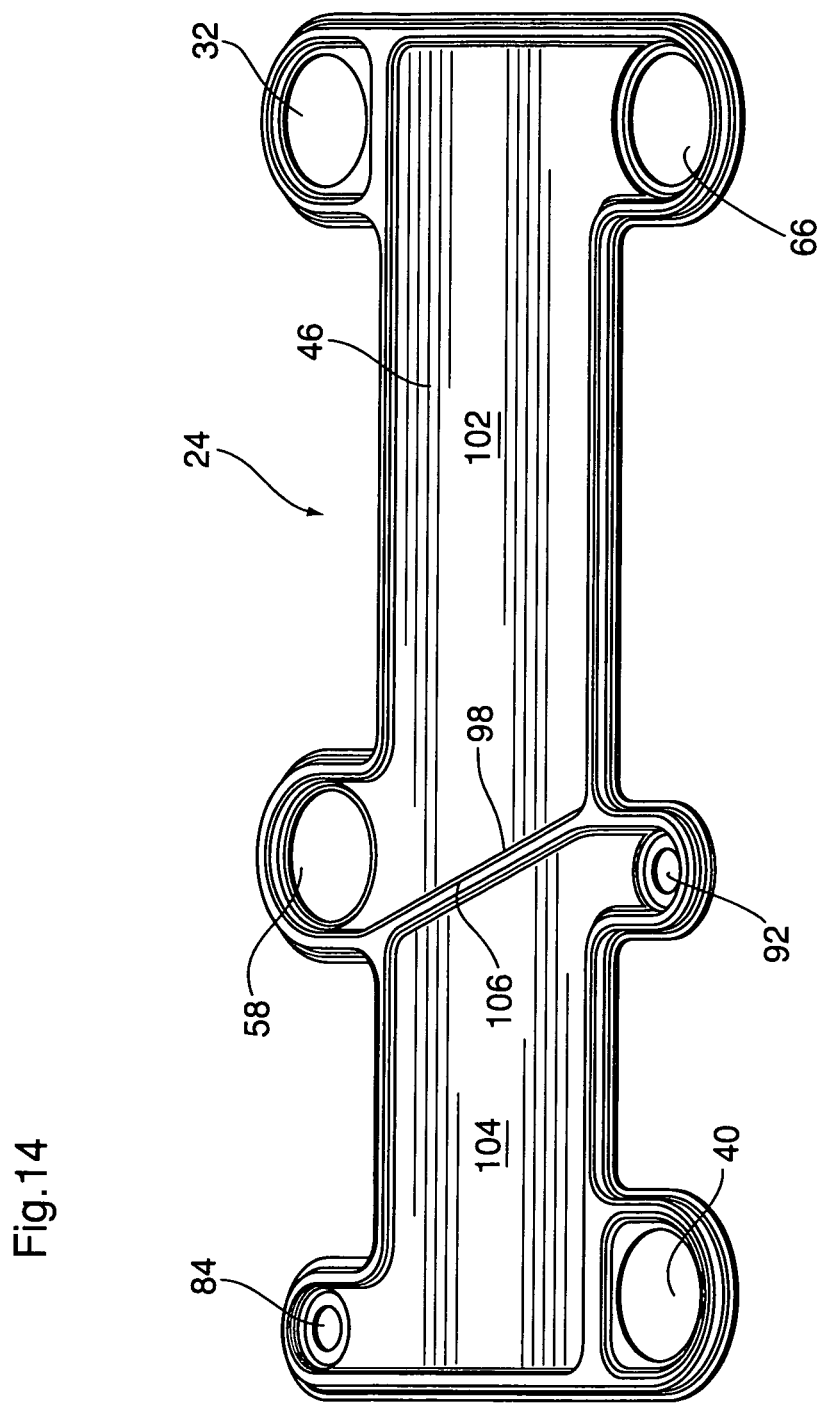
FIG. 14 is a bottom perspective view of the first core plate.
Figure 15:
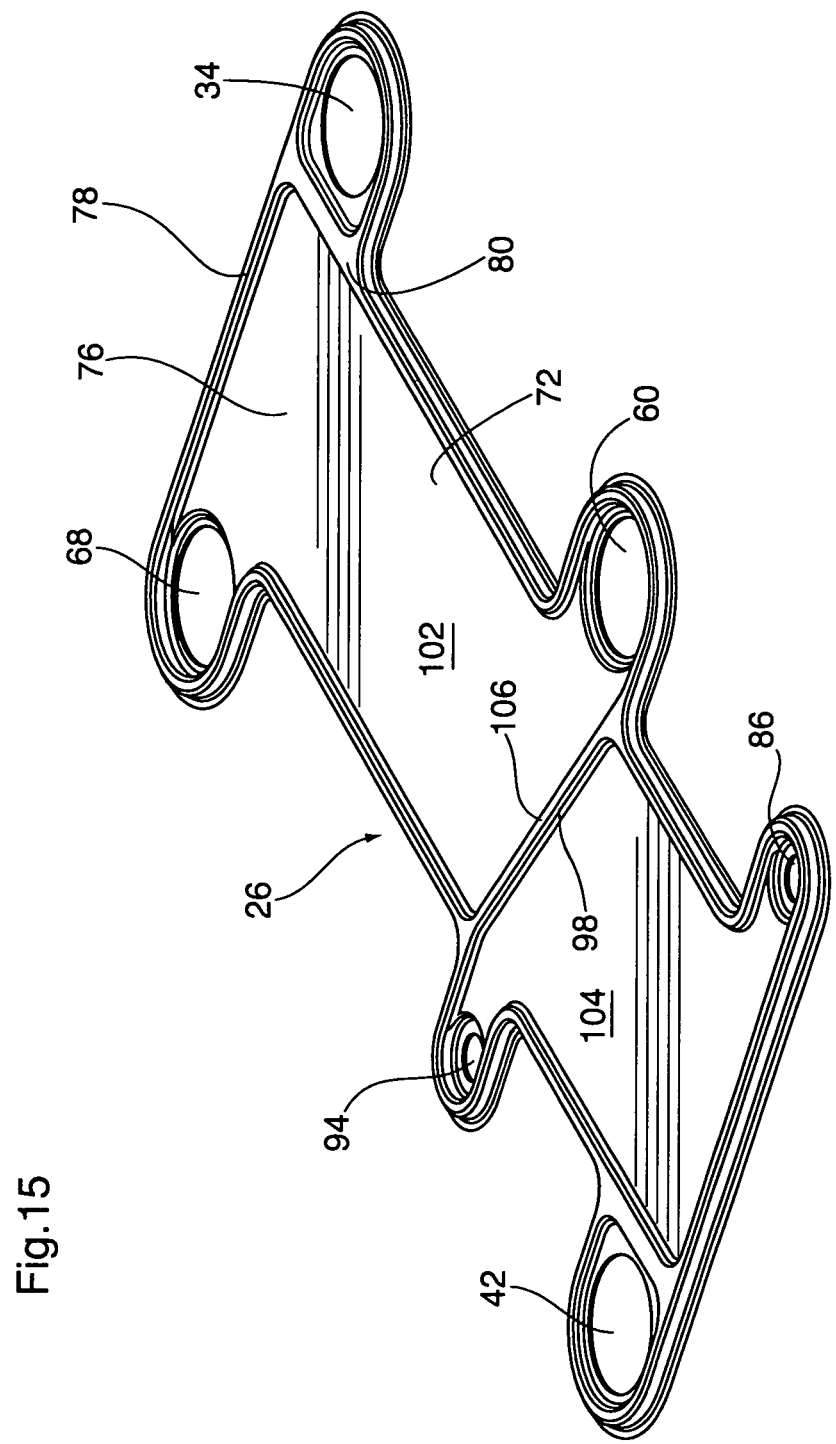
FIG. 15 is a top perspective view of a second core plate thereof.
Figure 16:
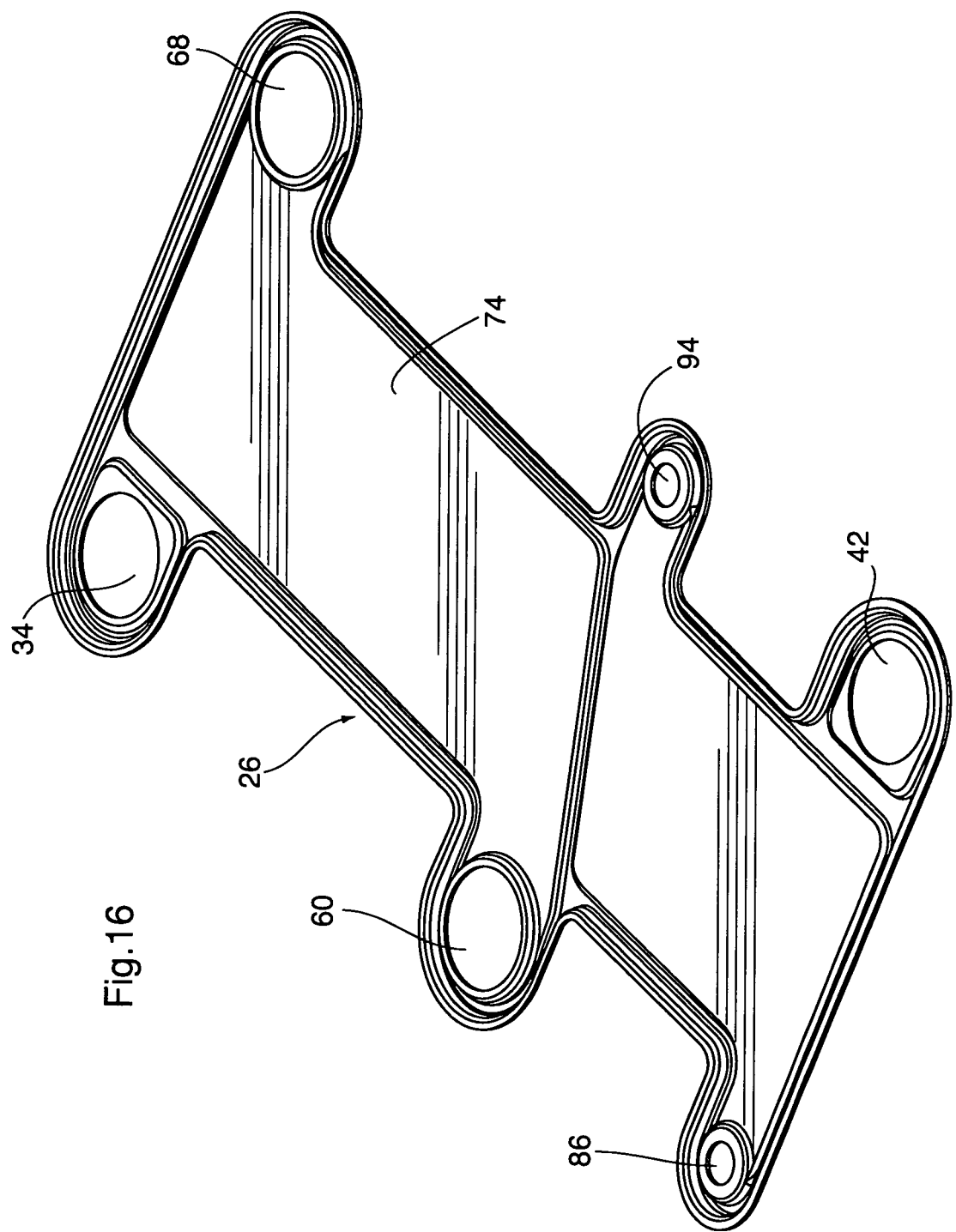
FIG. 16 is a bottom perspective view of the second core plate.

Rather than fins or turbulizers, it will be appreciated that the plate bottoms 50, 76 of first and second core plates 24, 26 may be provided with turbulence-enhancing projections such as ribs and/or dimples (not shown). Additionally, it will be noted that the planar portions of plate bottoms 50, 76 of adjacent first and second core plates 24, 26 are in contact with one another in core 22, and will typically be sealed together by brazing. Holes may be cut into the planar portions of each abutting pair of plate bottoms 50, 76, providing that the holes do not cause a leak path. The holes promote reliable brazing of the plate bottoms 50, 76 to one another, and also reduce the conductive resistance of the double plate thickness of plate bottoms 50, 76. One or both of first and second core plates 24, 26 may be provided with such holes, again provided that the holes in adjacent first and second core plates 24, 26 do not align to create leak paths. The holes can vary in size and number. For the purpose of illustration, FIG. 8 shows a single, large cutout 118 (in dashed lines) in the central portion of plate bottom 50 for improving brazing between plate bottom 50 and the plate bottom 76 of an adjacent second core plate 26. FIG. 10 shows a plurality of small holes 119 in first core plate 24 and holes 121 in second core plate 26 to aid in reliably brazing the first and second core plates 24, 26 together. As shown, the holes 119, 121 do not overlap one another so as to avoid the creation of leak paths through the paired first and second core plates 24, 26. Also, it will be appreciated that holes 119, 121 may be provided throughout the planar portions of plate bottoms 50, 76, i.e. excluding the area of rib 98, in which neither first core plate 24 or second core plate 26 is perforated so as to avoid the formation of leak paths.

A heat exchanger 200 according to a second embodiment of the invention is now described below with reference to FIGS. 12-19. The heat exchanger 200 includes a core having a structure which is similar to core 22 of heat exchanger 100. Like elements of heat exchanger 200 are identified by like reference numerals and a detailed description of these elements is omitted below.

The core 22 of heat exchanger 200 is self-enclosed and does not require an external housing. The heat exchanger 200 may further comprise a bottom plate located at the bottom of core 22, a top plate located at the top of core 22, a base plate for mounting, and inlet and outlet fittings for the charge air and the two coolants, none of which are shown in the drawings.

The core 22 is made up of a plurality of core plates which are joined together face-to-face in order to form alternating flow passages for charge air and the two coolants. Core 22 includes a plurality of first core plates 24 and a plurality of second core plates 26. Although the core 22 of heat exchanger 200 is self-enclosed and is made up of core plates 24, 26 joined together face-to-face, it will be appreciated that the heat exchanger 200 may instead be made up of a stack of dished plates, having nesting upstanding edges. Alternatively, a bar and plate (skeleton) construction may be used for the heat exchanger, although this configuration is less amenable to high volume production.

The core 22 of heat exchanger 200 includes a charge air inlet manifold 30 which is made up of aligned charge air inlet openings 32 and 34 in respective core plates 24 and 26. The core 22 also comprises a charge air outlet manifold 38 made up of aligned charge air outlet openings 40 and 42 of respective core plates 24 and 26.

Figure 17:
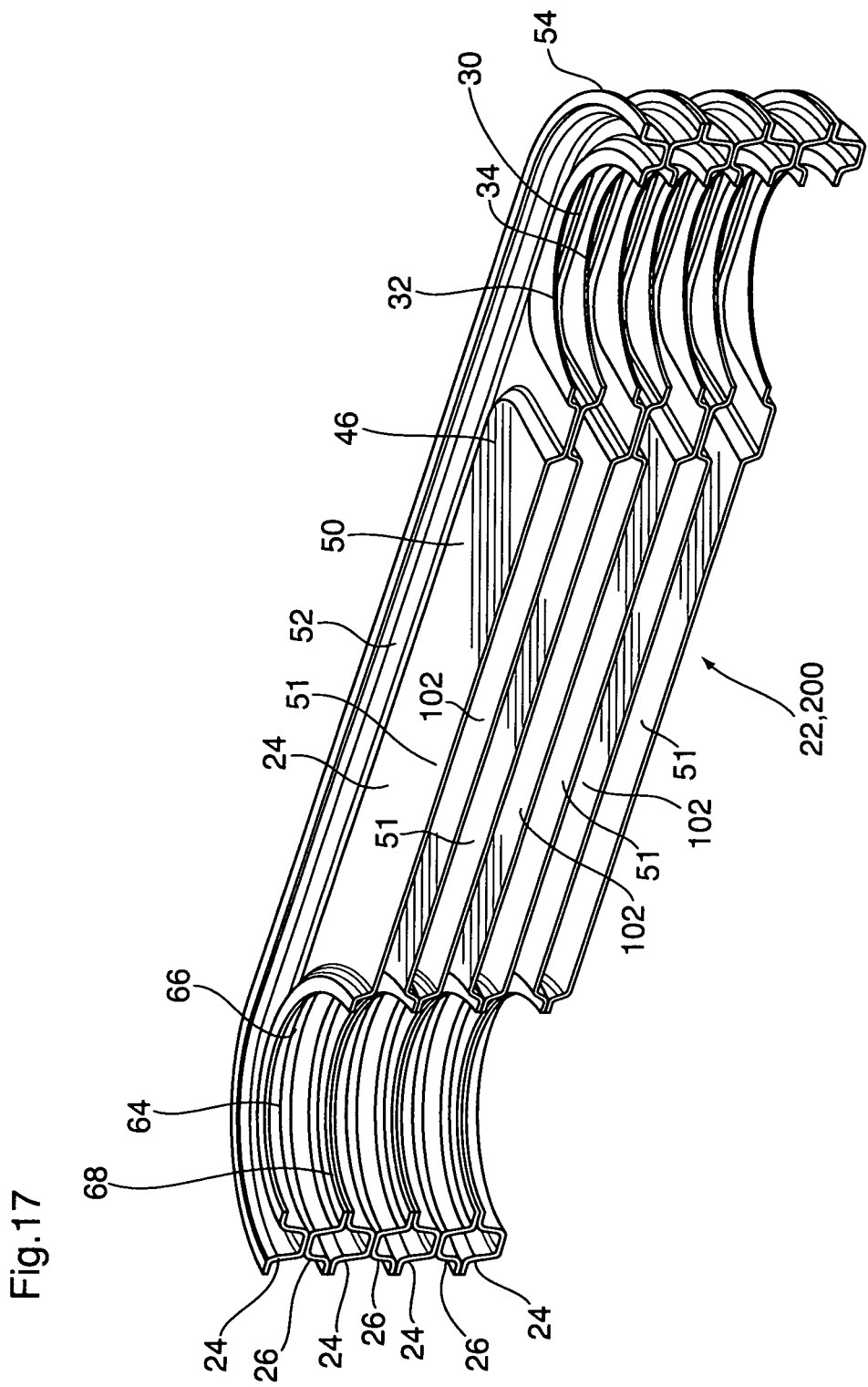
FIG. 17 is a transverse cross section along line 17-17' of FIG. 12.
Figure 18:
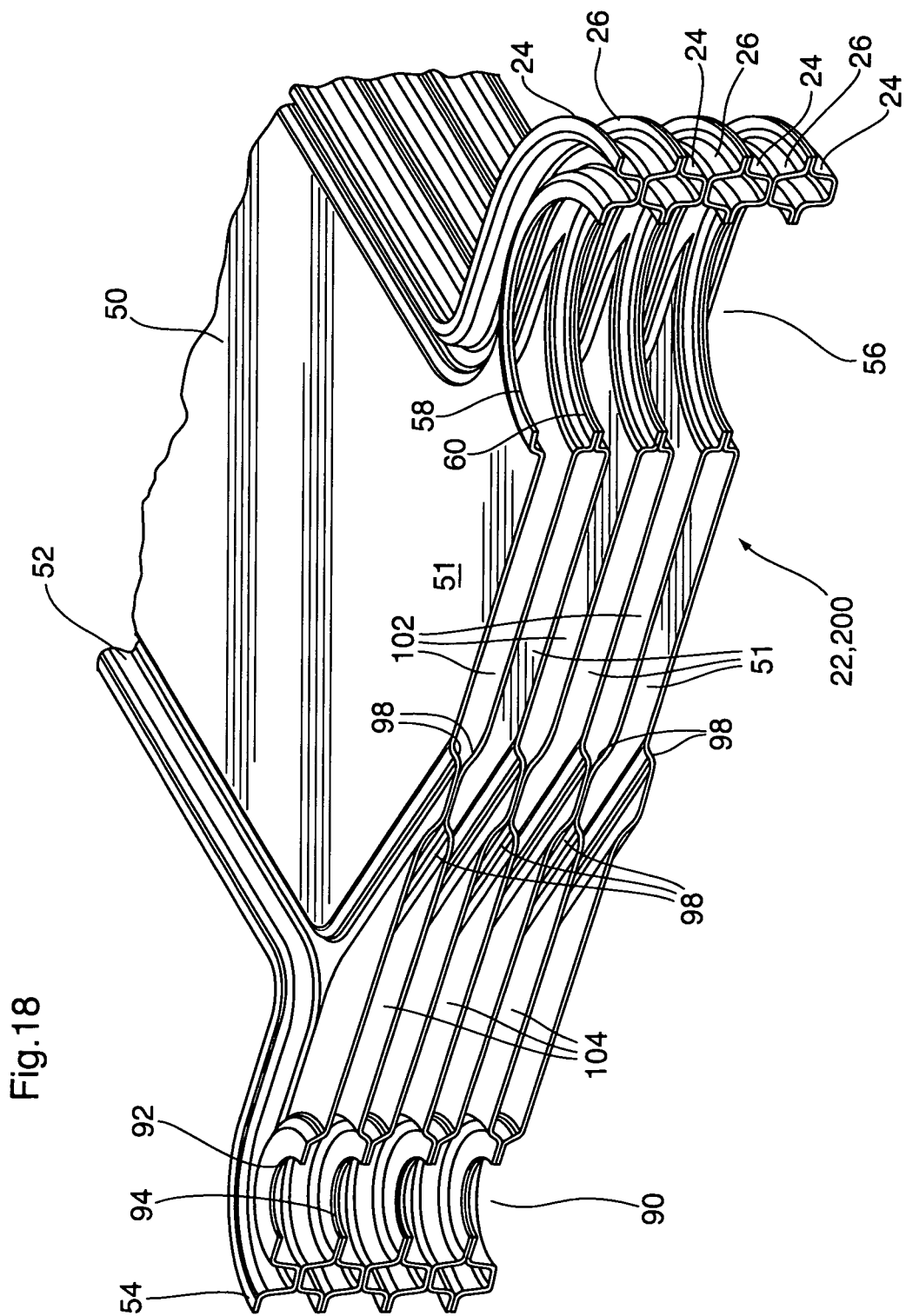
FIG. 18 is a transverse cross section along line 18-18' of FIG. 12.

As best seen in the cross-sections of FIGS. 17 and 19, the plate bottom 50 of first core plate 24 is co-planar with the charge air inlet and outlet openings 32, 40, such that the charge air flow passage 51 for charge air is defined by the space between the top face 46 of first core plate 24 and the bottom face 74 of an adjacent second core plate 26.

The gaseous coolant inlet manifold 56 and gaseous coolant outlet manifold 64 are in communication with a gaseous coolant flow passage 102 which is located between the bottom face 48 of a first core plate 24 and the top face 72 of a second core plate 26. It can be seen that the gaseous coolant inlet and outlet openings 58 and 66 of first core plate 24 are sealed from the charge air flow passage by the upstanding wall 52 and sealing surface 54 which completely surround gaseous coolant inlet and outlet openings 58 and 66. However, the gaseous coolant inlet and outlet openings 60 and 68 of the second core plate 26 are in flow communication with the plate bottom 76 such that each gaseous coolant flow passage 102 is defined between the top face 72 of a second core plate and the bottom face 48 of an adjacent first core plate 24.

Similarly, the liquid coolant inlet and outlet manifolds 82 and 90 are defined by respective liquid coolant inlet openings 84, 86 and liquid coolant outlet openings 92, 94. The liquid coolant inlet and outlet openings 86, 94 of second core plate 26 are in flow communication with the plate bottom 76, and therefore each liquid coolant flow passage 104 is defined between the plate bottom 76 of a second core plate 26 and the plate bottom 50 of an adjacent first core plate 24.

It can be seen that the configuration of first and second core plates 24, 26 in heat exchanger 200 eliminates the need for the flat separator plate 28 of heat exchanger 100. However, as shown in FIG. 19, the charge air flow passages 51 of heat exchanger 200 have bypass channels 120 at their edges, caused by the presence of an upwardly-extending first peripheral sealing rib (in the form of upstanding wall 52) extending upwardly from the top face 46 of first core plate 24, and an adjacent second peripheral sealing rib 122 extending downwardly from the bottom face 48 of first core plate 24. Similarly, the second core plate 26 has a downwardly-extending first peripheral sealing rib (in the form of downwardly extending wall 78) extending downwardly from its bottom face 74, and an adjacent second peripheral sealing rib 124 extending upwardly from its top face 72. The second peripheral sealing rib 122 of the first core plate 24 seals to a corresponding second peripheral sealing rib 124 of an adjacent second core plate 26 to seal the edges of a coolant flow passage 102, 104. The bypass channel 120 extends continuously between the charge air inlet and outlet manifolds 30, 38 and creates low pressure drop passages for the charge air in each of the charge air flow passages. These bypass channels 120 can be partially or completely eliminated by local deformation of the first core plate 24 in this region to create a rib which partly or completely blocks the bypass channel 120. For example, as shown in FIG. 19, the edge of plate bottom 50, which is raised relative to the second peripheral sealing rib 122 of first core plate 24 and bypass channel 120, is deformed outwardly toward first peripheral sealing rib 52 so as to form a blocking rib 126 which partially blocks the bypass channel 120 while leaving sufficient contact area between the second peripheral sealing ribs 122, 124 to maintain an effective seal. It will be appreciated that several blocking ribs 126 can be provided along the bypass channel 120, along both long sides of first core plate 24.

Although the invention has been described with reference to certain embodiments, it is not limited thereto. Rather, the invention includes all embodiments which may fall within the following claims.

What is claimed is:

1. A three-fluid charge air cooler comprising a plurality of plates arranged in a plate stack having a first end and a second end and a length extending from the first end to the second end, the plate stack being divided along its length into a first portion and a second portion, the charge air cooler having a plurality of charge air flow passages alternating throughout the stack with a plurality of first coolant flow passages and with a plurality of second coolant flow passages, wherein the three-fluid charge air cooler further comprises:
    a plurality of ribs dividing the first portion of the plate stack from the second portion of the plate stack, wherein each of the ribs is formed in one of the plates of the plate stack and extends transversely across said plate to separate one of the first coolant flow passages from one of the second coolant flow passages, and such that the plurality of ribs separates the plurality of first coolant flow passages from the plurality of second coolant flow passages;
    a charge air inlet manifold and a charge air outlet manifold in flow communication with the plurality of charge air flow passages, wherein the charge air inlet manifold and the charge air outlet manifold are located proximate to opposite ends of the plate stack;
    a first coolant inlet manifold and a first coolant outlet manifold in flow communication with the plurality of said first coolant flow passages, wherein the first coolant flow passages extend along the second portion of the plate stack, wherein, the first coolant inlet manifold is located at the second end of the plate stack, and the first coolant outlet manifold is located in the second portion of the plate stack, proximate to said ribs;
    a second coolant inlet manifold and a second coolant outlet manifold in flow communication with the plurality of said second coolant flow passages, wherein the second coolant flow passages extend along the first portion of the plate stack, and wherein the second coolant inlet manifold is located in the first portion of the plate stack, proximate to said ribs, and the second coolant outlet manifold is located at the first end of the plate stack;
    wherein the first coolant is a liquid coolant and the second coolant is a gaseous coolant;
    wherein the plurality of plates comprises a plurality of first core plates and a plurality of second core plates;
    wherein the charge air inlet manifold is made up of aligned charge air inlet openings of the first and second core plates, and the charge air outlet manifold is made up of aligned charge air outlet openings of the first and second core plates;
    wherein each of the first core plates has a plate bottom which is co-planar with the charge air inlet opening and the charge air outlet opening of the first core plate, such that each of the charge air flow passages is defined by a space between a top face of one of the first core plates and a bottom face of an upwardly adjacent one of the second core plates;
    wherein each of the first coolant flow passages and each of the second coolant flow passages is defined between a bottom face of one of the first core plates and a top face of a downwardly adjacent one of the second core plates;
    wherein each of the first core plates has a first peripheral sealing rib extending upwardly from its top face and each of the second core plates has a first peripheral sealing rib extending downwardly from its bottom face, with the first peripheral sealing rib of each said first core plate being directly joined to the first peripheral sealing rib of the upwardly adjacent one of the second core plates, wherein the first peripheral sealing ribs of the first and second core plates seal edges of the charge air flow passages;
    wherein each of the first core plates has a second peripheral sealing rib extending downwardly from its bottom face and each of the second core plates has a second peripheral sealing rib extending upwardly from its top face, with the second peripheral sealing rib of each said first core plate being directly joined to the second peripheral sealing rib of the downwardly adjacent one of the second core plates, wherein the second peripheral sealing ribs of the first and second core plates seal edges of the first and second coolant flow passages; and
    wherein the first and second peripheral sealing ribs of the first and second core plates are adjacent to one another.

2. The three-fluid charge air cooler of claim 1, wherein the charge air inlet manifold is located at the first end of the plate stack and the charge air outlet manifold is located at the second end of the plate stack.

3. The three-fluid charge air cooler of claim 1, wherein the inlet and outlet manifolds for the charge air, the first coolant and the second coolant are integrally formed with and enclosed by the plate stack.

4. The three-fluid charge air cooler of claim 3, wherein the charge air flow passages extend along the entire length of the plate stack.

5. A system for producing a pressurized cathode air stream for use in a fuel cell, comprising:
    (a) a first charge air cooler comprising a gas-to-gas charge air cooler for cooling said pressurized cathode air stream from a first temperature ($T_1$) to a third temperature ($T_3$) with a gaseous coolant having a second temperature ($T_2$) at an inlet of the first charge air cooler;
    (b) a second charge air cooler comprising a liquid-to-gas charge air cooler for cooling said pressurized cathode air stream from said third temperature ($T_3$) to a fifth temperature ($T_5$) with a liquid coolant having a fourth temperature ($T_4$) at a coolant inlet of said second charge air cooler;
    (c) a gas-to-gas humidifier for increasing a water content of the pressurized cathode air stream by transfer of water from a humidifying gas; and
    (d) a fuel cell stack having a cathode air inlet and a cathode exhaust gas outlet;
    wherein the humidifying gas comprises a cathode exhaust gas stream from the cathode exhaust gas outlet of the fuel cell stack;
    the gaseous coolant of the first charge air cooler comprises the cathode exhaust gas stream;
    the first charge air cooler is arranged to receive the cathode exhaust gas stream from the humidifier and the humidifier is arranged to receive the cathode exhaust gas stream from the cathode exhaust gas outlet of the fuel cell stack;
    wherein the first charge air cooler and the second charge air cooler are integrated into a three-fluid charge air cooler comprising a plurality of charge air flow passages for said pressurized cathode air stream, a plurality of first coolant flow passages for said liquid coolant, and a plurality of second coolant flow passages for said gaseous coolant;

wherein the three-fluid charge air cooler further comprises:

a plurality of plates arranged in a plate stack having a first end and a second end and a length extending from the first end to the second end, the plate stack being divided along its length into a first portion and a second portion, wherein the charge air flow passages alternate throughout the stack with the plurality of first coolant flow passages and the plurality of second coolant flow passages;

a plurality of ribs dividing the first portion of the plate stack from the second portion of the plate stack, wherein each of the ribs is formed in one of the plates of the plate stack and extends transversely across said plate to separate one of the first coolant flow passages from one of the second coolant flow passages, and such that the plurality of ribs separates the plurality of first coolant flow passages from the plurality of second coolant flow passages;

a charge air inlet manifold and a charge air outlet manifold in flow communication with the plurality of charge air flow passages, wherein the charge air inlet manifold and the charge air outlet manifold are located proximate to opposite ends of the plate stack;

a first coolant inlet manifold and a first coolant outlet manifold in flow communication with the plurality of said first coolant flow passages, wherein the first coolant flow passages extend along the second portion of the plate stack, wherein, the first coolant inlet manifold is located at the second end of the plate stack, and the first coolant outlet manifold is located in the second portion of the plate stack, proximate to said ribs; and a second coolant inlet manifold and a second coolant outlet manifold in flow communication with the plurality of said second coolant flow passages, wherein the second coolant flow passages extend along the first portion of the plate stack, and wherein the second coolant inlet manifold is located in the first portion of the plate stack, proximate to said ribs, and the second coolant outlet manifold is located at the first end of the plate stack;

wherein the plurality of plates comprises a plurality of first core plates and a plurality of second core plates;

wherein the charge air inlet manifold is made up of aligned charge air inlet openings of the first and second core plates, and the charge air outlet manifold is made up of aligned charge air outlet openings of the first and second core plates;

wherein each of the first core plates has a plate bottom which is co-planar with the charge air inlet opening and the charge air outlet opening of the first core plate, such that each of the charge air flow passages is defined by a space between a top face of one of the first core plates and a bottom face of an upwardly adjacent one of the second core plates;

wherein each of the first coolant flow passages and each of the second coolant flow passages is defined between a bottom face of one of the first core plates and a top face of a downwardly adjacent one of the second core plates;

wherein each of the first core plates has a first peripheral sealing rib extending upwardly from its top face and each of the second core plates has a first peripheral sealing rib extending downwardly from its bottom face, with the first peripheral sealing rib of each said first core plate being directly joined to the first peripheral sealing rib of the upwardly adjacent one of the second core plates, wherein the first peripheral sealing ribs of the first and second core plates seal edges of the charge air flow passages;

wherein each of the first core plates has a second peripheral sealing rib extending downwardly from its bottom face and each of the second core plates has a second peripheral sealing rib extending upwardly from its top face, with the second peripheral sealing rib of each said first core plate being directly joined to the second peripheral sealing rib of the downwardly adjacent one of the second core plates, wherein the second peripheral sealing ribs of the first and second core plates seal edges of the first and second coolant flow passages; and wherein the first and second peripheral sealing ribs of the first and second core plates are adjacent to one another.

6. The system of claim 5, wherein the first charge air cooler and the second charge air cooler are arranged sequentially such that the second charge air cooler receives said pressurized cathode air stream at said third temperature ($T_3$) from said first charge air cooler.

7. The system of claim 5, wherein the cathode air inlet receives said pressurized cathode air stream from said gas-to-gas humidifier.

8. The system of claim 5, further comprising a compressor which receives air at ambient temperature and pressure and compresses said ambient air to produce said pressurized cathode air stream at said first temperature ($T_1$), and wherein the first charge air cooler receives the pressurized cathode air stream from the compressor.

9. The system of claim 5, wherein the gas-to-gas humidifier is a membrane humidifier.

10. The system of claim 5, wherein the liquid coolant circulates through a cooling circuit which also includes the fuel cell stack, and wherein the cooling circuit includes a variable speed pump which controls a flow of the liquid coolant through the fuel cell stack and the second charge air cooler.

11. The system of claim 5, wherein the charge air inlet manifold is located at the first end of the plate stack and the charge air outlet manifold is located at the second end of the plate stack.

12. The system of claim 5, wherein the inlet and outlet manifolds for the charge air, the gaseous coolant and the liquid coolant are integrally formed with and enclosed by the plate stack.

13. The system of claim 12, wherein the charge air flow passages extend along the entire length of the plate stack.

14. The system of claim 5, wherein the edges of the charge air flow passages have bypass channels, each of the bypass channels being defined by one pair of said first and second peripheral sealing ribs, and extending along the top face of one of the first core plates or the bottom face of one of the second core plates between the charge air inlet and outlet manifolds; and wherein the three-fluid heat exchanger further comprises one or more blocking ribs, each of the blocking ribs being located in one of the charge air flow passages and partly or completely blocking one of the bypass channels.

15. The system of claim 14, wherein each of the blocking ribs is formed by local deformation of one of the core plates.

16. The system of claim 15, wherein each said local deformation comprises deformation of an edge of the plate bottom outwardly toward the first sealing rib.

17. A method for cooling a pressurized cathode air stream, wherein the method comprises:
(a) providing the system for producing a pressurized cathode air stream according to claim 8;
(b) providing said pressurized cathode air stream having said first temperature ($T_1$);
(c) passing said pressurized cathode air stream through said first charge air cooler in heat exchange with said cathode exhaust gas stream from said fuel cell stack, wherein said cathode exhaust gas stream has said second temperature ($T_2$) at said inlet of said first charge air cooler and said pressurized cathode air stream is cooled to said third temperature ($T_3$) at an outlet of said first charge air cooler;
(d) passing said pressurized cathode air stream through said second charge air cooler in heat exchange with a liquid coolant having said fourth temperature ($T_4$) at said coolant inlet of said second charge air cooler, wherein said pressurized cathode air stream is cooled to said fifth temperature ($T_5$) at an outlet of said second charge air cooler;
(e) passing said pressurized cathode air stream and said cathode exhaust stream through said gas-to-gas humidifier, wherein water vapour is transferred from the cathode exhaust stream to the pressurized cathode air stream in said humidifier; and
(f) passing said pressurized cathode air stream to said cathode air inlet of said fuel cell stack;
wherein said cathode exhaust stream passes through said gas-to-gas humidifier before passing through said first charge air cooler; and wherein said pressurized cathode air stream passes through said humidifier after it passes through said second charge air cooler and before it enters the cathode air inlet of said fuel cell stack.

18. The method of claim 17, wherein $T_2 < T_3 < T_1$ under normal operating conditions.

19. The method of claim 17, wherein $T_4 < T_5 < T_3$ under normal operating conditions.

20. The method of claim 17, wherein the cathode exhaust gas stream is at a sixth temperature ($T^6$) at an inlet of said gas-to-gas humidifier and wherein the pressurized cathode air stream is at a seventh temperature ($T_7$) at an outlet of the gas-to-gas humidifier, wherein $T_5 < T_7 < T_6$ under normal operating conditions.

21. The method of claim 20, wherein $T_2 < T_6$ under normal operating conditions.

22. The method of claim 17, wherein the liquid coolant absorbs heat from one or more other heat sources within the fuel cell system.

23. The method of claim 17, wherein the amount of thermal energy removed from the pressurized cathode air stream by the first charge air cooler is greater than the amount of thermal energy removed from the pressurized cathode air stream by the second charge air cooler.

* * * * *